(12) United States Patent
Chowdhury

(10) Patent No.: US 7,379,949 B2
(45) Date of Patent: May 27, 2008

(54) ANALYZING A QUERY LOG FOR USE IN MANAGING CATEGORY-SPECIFIC ELECTRONIC CONTENT

(75) Inventor: Abdur R. Chowdhury, Oakton, VA (US)

(73) Assignee: AOL LLC, Dulles, VA (US)

( * ) Notice: Subject to any disclaimer, the term of this patent is extended or adjusted under 35 U.S.C. 154(b) by 319 days.

(21) Appl. No.: 11/171,506

(22) Filed: Jul. 1, 2005

(65) Prior Publication Data
US 2006/0004850 A1    Jan. 5, 2006

Related U.S. Application Data

(60) Provisional application No. 60/584,137, filed on Jul. 1, 2004.

(51) Int. Cl.
*G06F 17/30* (2006.01)

(52) U.S. Cl. .............................. 707/103 R; 707/103 X; 707/103 Y; 707/103 Z; 707/2; 707/3; 707/4

(58) Field of Classification Search .................... 707/3, 707/4, 5, 6, 10, 103, 104, 103 R
See application file for complete search history.

(56) References Cited

U.S. PATENT DOCUMENTS

| | | | | |
|---|---|---|---|---|
| 5,265,065 | A | 11/1993 | Turtle | 707/4 |
| 5,640,553 | A | 6/1997 | Schultz | 707/5 |
| 5,675,788 | A * | 10/1997 | Husick et al. | 707/104.1 |
| 5,873,076 | A * | 2/1999 | Barr et al. | 707/3 |
| 5,924,090 | A | 7/1999 | Krellenstein | 707/5 |

(Continued)

FOREIGN PATENT DOCUMENTS

EP    1060449 B1    12/2000

(Continued)

OTHER PUBLICATIONS

Latifur R. Khan, "Ontology-based Information Selection," a dissertation presented to the Faculty of the Graduate School University of Southern California, Aug. 2000, 128 pages.

(Continued)

*Primary Examiner*—Pierre Vital
*Assistant Examiner*—Mohammad S Rostami
(74) *Attorney, Agent, or Firm*—Fish & Richardson P.C.

(57) ABSTRACT

Providing category-specific electronic content includes receiving a request for electronic content. The request has an attribute. The attribute of the received request is compared to an attribute related to a query included in a log of search queries. An indication of a category that represents a search query from a log of search queries that is related to an attribute that matches the attribute of the received request is accessed, and electronic content that is representative of the identified category is accessed and provided. Caching electronic content includes receiving electronic content for inclusion in a cache, the electronic content having an attribute and identifying a category to which the electronic content corresponds An indication of a category that represents a query from a log of search queries that is related to an attribute that matches the attribute of the electronic content is accessed. The electronic content is included in a cache when the identified category matches the indicated category.

28 Claims, 19 Drawing Sheets

U.S. PATENT DOCUMENTS

| | | | |
|---|---|---|---|
| 5,933,822 A | 8/1999 | Braden-Harder et al. | 707/5 |
| 6,012,053 A | 1/2000 | Pant et al. | 707/3 |
| 6,169,986 B1 | 1/2001 | Bowman et al. | 707/5 |
| 6,175,829 B1 | 1/2001 | Li et al. | 707/3 |
| 6,272,507 B1 | 8/2001 | Pirolli et al. | 715/513 |
| 6,275,820 B1 | 8/2001 | Navin-Chandra et al. | 707/3 |
| 6,311,194 B1* | 10/2001 | Sheth et al. | 715/505 |
| 6,363,378 B1 | 3/2002 | Conklin et al. | 707/5 |
| 6,424,973 B1 | 7/2002 | Baclawski | 707/102 |
| 6,460,029 B1 | 10/2002 | Fries et al. | 707/3 |
| 6,571,249 B1 | 5/2003 | Garrecht | 707/100 |
| 6,647,383 B1* | 11/2003 | August et al. | 707/3 |
| 6,675,159 B1 | 1/2004 | Lin et al. | 707/3 |
| 6,701,310 B1 | 3/2004 | Sugiura et al. | 707/5 |
| 6,728,704 B2 | 4/2004 | Mao et al. | 707/3 |
| 6,751,611 B2 | 6/2004 | Krupin et al. | 707/3 |
| 6,778,979 B2 | 8/2004 | Grefenstette et al. | 707/3 |
| 6,778,982 B1 | 8/2004 | Knight | 707/3 |
| 6,795,820 B2 | 9/2004 | Barnett | 707/3 |
| 6,853,982 B2 | 2/2005 | Smith et al. | 705/27 |
| 6,961,723 B2* | 11/2005 | Faybishenko et al. | 707/3 |
| 7,110,983 B2* | 9/2006 | Shear et al. | 705/55 |
| 7,181,438 B1* | 2/2007 | Szabo | 707/2 |
| 2001/0049688 A1* | 12/2001 | Fratkina et al. | 707/104.1 |
| 2002/0026443 A1 | 2/2002 | Chang | 707/10 |
| 2002/0129015 A1 | 9/2002 | Caudill et al. | 707/6 |
| 2002/0165860 A1 | 11/2002 | Glover et al. | 707/3 |
| 2002/0169764 A1 | 11/2002 | Kineaid et al. | 707/5 |
| 2003/0004939 A1 | 1/2003 | Yamaguchi et al. | 707/3 |
| 2003/0212673 A1 | 11/2003 | Kadayam et al. | 707/3 |
| 2003/0220913 A1 | 11/2003 | Doganata et al. | 707/3 |
| 2004/0010491 A1 | 1/2004 | Riedinger | 707/3 |
| 2004/0019588 A1 | 1/2004 | Doganata et al. | 707/102 |
| 2004/0024752 A1 | 2/2004 | Manber et al. | 707/3 |
| 2004/0059729 A1 | 3/2004 | Krupin et al. | 707/3 |
| 2004/0215607 A1 | 10/2004 | Travis, Jr. | 707/3 |
| 2004/0220907 A1 | 11/2004 | Camarillo | 707/3 |
| 2004/0254920 A1 | 12/2004 | Brill et al. | 707/3 |
| 2005/0102259 A1 | 5/2005 | Kapur | 707/3 |
| 2005/0154716 A1 | 7/2005 | Watson et al. | 707/3 |
| 2006/0020672 A1 | 1/2006 | Shannon et al. | 709/206 |
| 2006/0167927 A1 | 7/2006 | Edelstein et al. | 707/102 |
| 2006/0248045 A1 | 11/2006 | Toledano et al. | 707/2 |

FOREIGN PATENT DOCUMENTS

| | | |
|---|---|---|
| WO | WO 97/21183 | 6/1997 |
| WO | WO 99/66427 | 12/1999 |
| WO | WO 01/16807 A1 | 3/2001 |
| WO | WO 02/13064 A2 | 2/2002 |
| WO | WO 2004/027669 A1 | 4/2004 |

OTHER PUBLICATIONS

Luo Si et al., "Using Sampled Data and Regression to Merge Search Engine Results," School of Computer Science, Carnegie Mellon University, Pittsburgh, PA 15213, Aug. 11-15, 2002, 8 pages.

"Distributed Information Retrieval in Lemur," printed Oct. 17, 2005 from http://newhaven.lti.cs.cmu.edu/3.1/distrib.html, The Lemur Project, last modified Mar. 23, 2005, 7 pages.

Steven M. Beitzel et al., "On Fusion of Effective Retrieval Strategies in the Same Information Retrieval System," Information Retrieval Laboratory, Illinois Institute of Technology, Chicago, IL 60616, Jul. 2004, 13 pages.

Steven M. Beitzel et al., "Evaluation of Filtering Current News Search Results," Information Retrieval Laboratory, Illinois Institute of Technology, Chicago, IL 60616, Jul. 25-29, 2004, 2 pages.

Abdur Chowdhury et al., "Operational Requirements for Scalable Search Systems," America Online, Nov. 3-8, 2003, 8 pages.

Office Action from copending U.S. Appl. No. 11/023,651, dated Apr. 30, 2007.

Office Action from copending U.S. Appl. No. 11/023,633, dated Apr. 18, 2007.

Office Action from copending U.S. Appl. No. 11/023,642, dated May 11, 2007.

Notice of Allowance from copending U.S. Appl. No. 11/023,648, dated May 16, 2007.

Office Action from copending U.S. Appl. No. 11/023,643, dated Apr. 2, 2007.

Rasolofo Y. et al., "Result Merging Strategies For A Current News Metasearcher," Information Processing & Management 39 (2003), Elsevier, Barking GB, pp. 581-609.

Oztekin B.U. and Karyis, G. and Kumat, Y., "Expert Agreement And Content Based Reranking In A Meta Search Environment Using Mearf," Proceedings of the 11th International Conference on World Wide Web. May 7-11, 2002, Honolulu, Hawaii, pp. 333-344.

Craswell, N., Hawking, D. and Thistlewaite, P., "Merging Results from Isolated Search Engines," Proceedings of the 10th Australasian Database Conference, Aukland, New Zealand, Jan. 18-21, 1999, 12 pages.

Meng, W. et al. "Building Efficient and Effective Metasearch Engines," ACM Computing Surveys, vol. 34, No. 1, Mar. 2002, New York, NY, pp. 48-89.

Spoerri A., "Coordinated Views And Tight Coupling To Support Mega Searching," Proceedings of the Second International Conference on Coordinated and Multiple Views in Exploratory Visualization, 2004, pp. 39-48.

Baeza-Yates, R. et al., "Modern Information Retrieval, Chapter 13, Searching the web," Modern Information Retrieval, Harlow: Addison-Wesley, GB, 1999, pp. 367-395.

Fei-Yue Wang et al., "An Application Specific Knowledge Engine For Researches In Intelligent Transportation Systems," 2004 IEEE Intelligent Transportation Systems Conference, Washington, DC, Oct. 3-6, 2004, pp. 841-846.

Etzioni, O., "Moving Up the Information Food Chain, Deploying Sofbots on the World Wide Web," Proceedings on the Thirteenth National Conference on Artificial Intelligence, Aug. 4, 1996, pp. 1322-1326.

Zhang, J. and Cheung, C. "Meta-Search-Engine Feature Analysis," Online Information Review, vol. 27, No. 6, 2003, pp. 433-441.

Desai, M. and Spink, A., "An Approach to Document Clustering Based on System Relevance," Proceedings of the 67th American Society for Information Science and Technology (ASIS&T), vol. 41, No. 1, Nov. 12, 2004, pp. 256-266.

Jain A. K., et al., "Data Clustering: A Review," ACM Computing Surveys, New York, NY, vol. 31, No. 3, Sep. 3, 1999, pp. 264-323.

Gauch, Susan et al., "Profusion: Intelligent Fusion from Multiple, Distributed Search Engines," Journal of Universal Computer Science, vol. 2, No. 9, Sep. 1996, 13 pages.

* cited by examiner

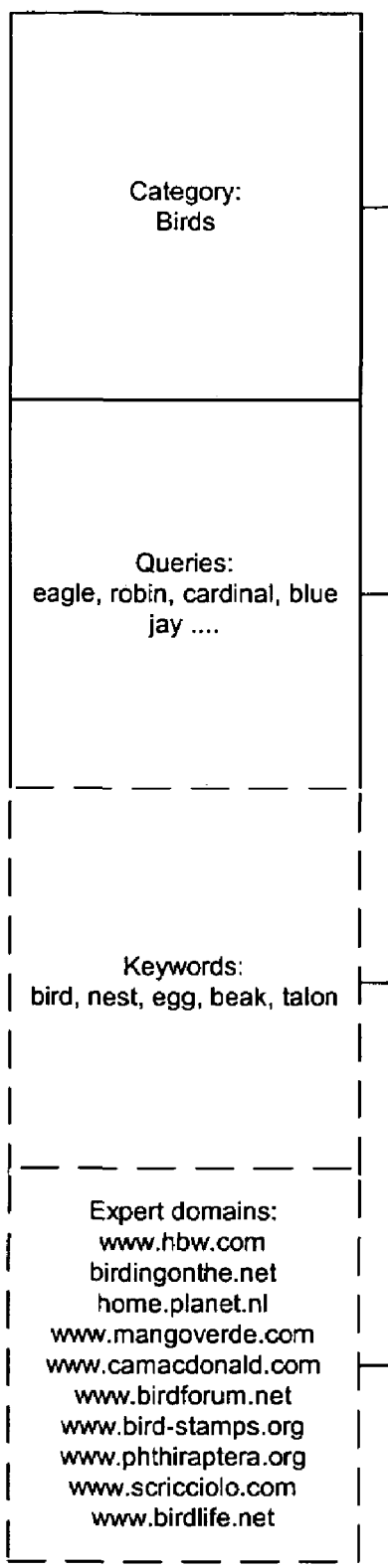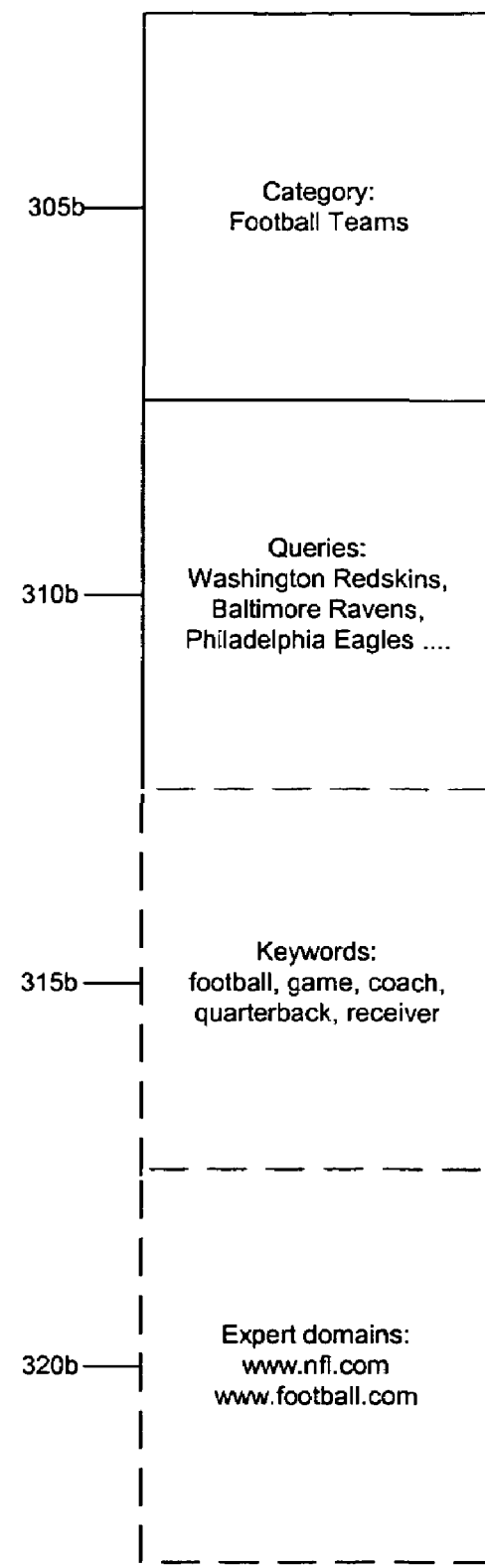
FIG. 3A
FIG. 3B

500

| Time Period | Category |
|---|---|
| 12 A.M. - 1 A.M. | A |
| 1 A.M. - 2 A.M. | S |
| 2 A.M. - 3 A.M. | D |
| 3 A.M. - 4 A.M. | F |
| 4 A.M. - 5 A.M. | F |
| 5 A.M. - 6 A.M. | F |
| 6 A.M. - 7 A.M. | W |
| 7 A.M. - 8 A.M. | W |
| 8 A.M. - 9 A.M. | W |
| 9 A.M. - 10 A.M. | W |
| 10 A.M. - 11 A.M. | G |
| 11 A.M. - 12 P.M. | G |
| 12 P.M. - 1 P.M. | G |
| 1 P.M. - 2 P.M. | G |
| 2 P.M. - 3 P.M. | T |
| 3 P.M. - 4 P.M. | T |
| 4 P.M. - 5 P.M. | T |
| 5 P.M. - 6 P.M. | T |
| 6 P.M. - 7 P.M. | J |
| 7 P.M. - 8 P.M. | J |
| 8 P.M. - 9 P.M. | J |
| 9 P.M. - 10 P.M. | J |
| 10 P.M. - 11 P.M. | A |
| 11 P.M. - 12 A.M. | A |

| Day | Category |
|---|---|
| Sunday | A |
| Monday | D |
| Tuesday | D |
| Wednesday | Z |
| Thursday | Q |
| Friday | A |
| Saturday | A |

| Time Period | Category |
|---|---|
| Weekday | A |
| Weekend | B |
| Christmas | C |
| Thanksgiving | D |
| Easter | E |

| Time Period | Category 1 | Category 2 | Category 3 |
|---|---|---|---|
| Morning | A | B | C |
| Afternoon | A | H | G |
| Evening | D | E | F |
| Night | E | F | D |

| Time Period | User Age | User Gender | Category |
|---|---|---|---|
| Morning | Adult | Male | News |
| Morning | Adult | Female | Weather |
| Morning | Child | Male | Cartoons |
| Morning | Child | Female | Dolls |
| Afternoon | Adult | Male | Business |
| Afternoon | Adult | Female | Cooking |
| Afternoon | Child | Male | Education |
| Afternoon | Child | Female | Education |
| Evening | Adult | Male | News |
| Evening | Adult | Female | News |
| Evening | Child | Male | Sports |
| Evening | Child | Female | Entertainment |
| Night | Adult | Male | Movies |
| Night | Adult | Female | Category |
| Night | Child | Male | TV Programs |
| Night | Child | User Gender | TVPrograms |

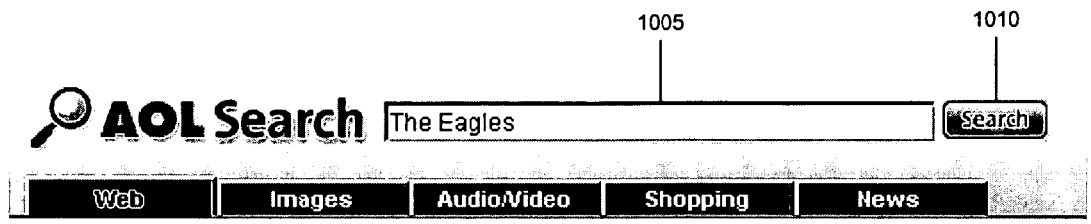

1020 — Original Query: eagles
1025 — Selected Category: The Eagles (Musicians)
1030 — Available Alternative Categories: Philadelphia Eagles (Football)   eagles (Bird)

Matching Sites: Page 1 of 64534
What is a Matching Site?

1015a — The Eagles ⊡ - The Eagles. Reviews on this page: ... The semi-offical Eagles web site includes all the standard trimmings, but unfortunately it's cluttered with too many pictures. ...
http://www.warr.org/eagles.html 1015b — Eagles fan site - Desperado ⊡ - -Help ...
http://www.eaglesmusic.com/

1015c — Amazon.com: Music: Eagles - Their Greatest Hits 1971-1975 ⊡ - ... So You'd Like to... Get a CD or 10...: A guide by nyggoblue, Music Collector Create your guide. Don Henley Check out our favorite Don Henley and Eagles titles! ...
http://www.amazon.com/exec/obidos/tg/detail/-/B000002GVS?v=glance 1015d — Amazon.com: Music: Hotel California ⊡ - ... If you want some good Eagles music, skip this one (and The Long Run), and pick up one of their first few LPs. Was this review helpful to you? (Report this). ...
http://www.amazon.com/exec/obidos/tg/detail/-/B000002GVO?v=glance
[More results from www.amazon.com]

1015e — Dansm's Eagles Page ⊡ - ... My page was designed so guitarists could have a site solely devoted to Eagles music. Below you'll find lots of guitar chords, tabs, and links to other pages. ...
http://www.people.fas.harvard.edu/~desmith/guitar/eagles.htm

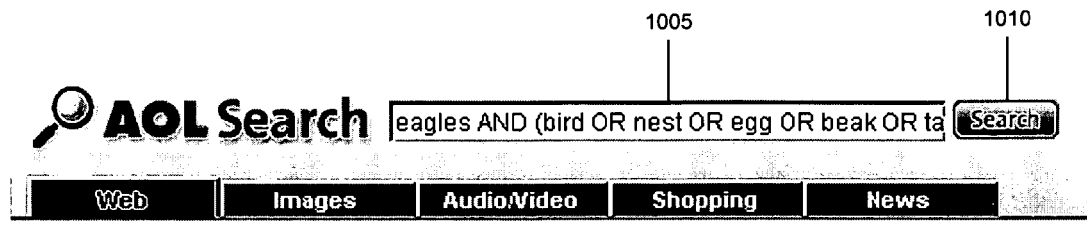

Matching Sites: Page 1 of 39601
What is a Matching Site?

1205a → CNN.com - Man smuggles eagles with bird flu - Oct 24, 2004 ⌂ - ... WORLD. Man smuggles eagles with bird flu. YOUR E-MAIL ALERTS. Thailand. Belgium. or Create your own. ...
http://www.cnn.com/2004/WORLD/europe/10/24/bird.flu.smuggler.ap/

1205b → The Australian: Smuggled eagles had bird flu [October 24, 2004] ⌂ - ... Smuggled eagles had bird flu From correspondents in Brussels October 24, 2004 TWO Asian eagles hidden in the baggage of a Thai man ...
http://www.theaustralian.news.com.au/common/story_page/0,5744,11171145%255E1702,00.html 1205c → Bald Eagles at the Iroquois National Wildlife Refuge ⌂ - ... over great distances, they usually return to nest within 100 ... to as many as 75,000 nesting bald eagles in the lower 48 states when the bird was adopted as ...
http://iroquoisnwr.fws.gov/BaldEagles.html 1205d → Oklahoma, "Perch poles" give bald eagles a bird's eye view of ... ⌂ - ... "Perch poles" give bald eagles a bird's eye view of the river. When the Neosho River began to cut into the roadbed of State Highway ...
http://www.fhwa.dot.gov/environment/wildlifeprotection/index.cfm?fuseaction=home.viewArticle&articleID=50

1205e → allAfrica.com: South Africa: Room for the Eagles to Nest ⌂ - Room for the Eagles to Nest. Email This Page Print This Page Visit The Publisher's Site. Sunday Times (Johannesburg). October 24, 2004 ...
http://allafrica.com/stories/200410250992.html

ANALYZING A QUERY LOG FOR USE IN MANAGING CATEGORY-SPECIFIC ELECTRONIC CONTENT

CROSS-REFERENCE TO RELATED APPLICATIONS

This application claims priority to U.S. Provisional Application No. 60/584,137, filed on Jul. 1, 2004, and titled "Analysis and Use of a Very Large Topically Categorized Web Query Log."

TECHNICAL FIELD

This document relates to analyzing a query log for use in managing category-specific electronic content.

BACKGROUND

When a user requests electronic content, the user may be directed to uninteresting electronic content. For example, conventional search engines retrieve a set of search results that correspond to a search query. Some search results may direct a user to Internet resources that do not interest the user, even though the search results match the search query. For example, this issue may arise when a query relates to multiple different topics, one or more of which being of relatively little or no interest to the query submitter, in which case search results are produced that are representative of each of the different topics. As another example, users may be presented with advertisements relating to subjects in which the user is not interested. As yet another example, a user may be provided with electronic content that is geared toward a demographic of user that does not represent the user.

SUMMARY

In one general aspect, providing category-specific electronic content includes receiving a request for electronic content. The request has an attribute. The attribute of the received request is compared to an attribute related to a query included in a log of search queries. An indication of a category based on a detected relationship between an attribute associated with that category and the attribute of the received request is accessed and provided.

Implementations may include one or more of the following features. For example, the accessed content may be presented.

Receiving a request for electronic content may include receiving a request for electronic content having an attribute identifying a time period during which the request was submitted. Comparing the attribute of the received request to an attribute of a query included in a log of search queries may include comparing the attribute identifying the time period to an attribute of a query from the log of search queries identifying a time period during which the query was submitted. Accessing an indication of a category may include accessing an indication of a category based on a detected match between a time period associated with the category and the time period identified by the attribute of the request. The attribute of a query from the query log may identify an hour within a day, a day within a week, a day within a month, a day within a year, a week within a month, a week within a year, or a month within a year during which the query was submitted. The attribute of the received request may identify an hour within a day, a day within a week, a day within a month, a day within a year, a week within a month, a week within a year, or a month within a year during which the received request was submitted.

Receiving a request for content may include receiving a request for electronic content having an attribute identifying a characteristic of a user that submitted the request. Comparing the attribute of the received request to an attribute of a query included in a log of search queries may include comparing the attribute identifying the user characteristic to an attribute of a query from the log of search queries identifying a characteristic of user that submitted the query. Accessing an indication of a category may include accessing an indication of a category based on a detected match between a user characteristic associated with the category and the user characteristic identified by the attribute of the request. The attribute of a query from the query log may identify a gender of a user that submitted the query, an age of the user that submitted the query, or a location of the user that submitted the query. The attribute of the received request may identify a gender of a user that submitted the received request, an age of the user that submitted the received request, or a location of the user that submitted the received request.

Receiving a request for electronic content may include receiving a request for electronic content that includes an advertisement. Accessing electronic content may include accessing an advertisement that corresponds to the identified category.

Receiving a request for electronic content may include receiving a search query for which search results are to be retrieved. Accessing the requested electronic content may include accessing search results that are representative of the identified category for the received search query. Accessing search results may include routing the search query to at least one source of search results that are representative of the identified category, and receiving search results for the search query from the at least one source.

Accessing search results may include formatting the query to be representative of the identified category, and retrieving search results for the formatted query. Formatting the query may include supplementing the query with additional information that is representative of the identified category. Supplementing the query may include formatting the query into a canonical form of the query for the identified category, or supplementing the query with one or more keywords that are representative of the identified category.

Accessing search results further may include identifying two categories to which the received search query corresponds. The two categories may be compared to the indicated category, and one of the two categories that matches the indicated category may be identified.

Accessing an indication of a category may include accessing an indication of a category having a high probability of representing a query from the log that has an attribute that matches the attribute of the received request.

For each attribute, queries from the query log that have the attribute may be identified. For each of the identified queries, a category corresponding to the identified query may be identified. For each category corresponding to one of the identified queries, a probability that the category corresponds to one of the identified queries may be identified. Accessing an indication of a category may include accessing an indication of a category with a high probability.

Identifying a category corresponding to the identified query may include accessing, for each category, a list of queries that correspond to the category. A category may be identified as corresponding to the identified query when at least a portion of the identified query matches at least a portion of one of the queries included in the list of queries for the category.

Accessing an indication of a category may include accessing a log of search queries, each of the search queries having an attribute. A query from the log having an attribute that matches the attribute of the received request may be identified, and a category corresponding to the identified query may be identified.

Accessing an indication of a category also may include accessing a table having entries. Each entry may be associated with an attribute and a category that represents a search query from a log of search queries that is related to the attribute. An entry of the table that is associated with the attribute of the received request may be identified, and a category that is associated with the identified entry in the table may be identified. Accessing a table may include accessing a table having entries, each entry being associated with multiple attributes and a category that represents a search query from a log of search queries that is related to the multiple attributes. Identifying an entry of the table may include identifying an entry of the table that is associated with multiple attributes of the received request. Accessing a table may include accessing a table having entries, each entry being associated with a time period and a category that represents a search query from a log of search queries that was submitted during the time period. Identifying an entry of the table may include identifying an entry of the table that is associated with a time period during which the request was received.

The request may have multiple attributes, each query included in the log of search queries may have multiple attributes, and each query included in the query log may be represented by multiple categories. Receiving a request for electronic content may include receiving the request for electronic content, the request having multiple attributes. Comparing the attribute of the received request to an attribute related to at least one query included in a log of search queries may include comparing the attributes of the received request to attributes related to a query included in a log of search queries. Accessing an indication of a category may include accessing an indication of multiple categories based on detected relationships between the attributes associated with the multiple categories and the attributes of the received request.

In another general aspect, caching electronic content includes receiving electronic content for inclusion in a cache, the electronic content having an attribute. A category to which the electronic content corresponds is identified. The attribute of the electronic content is compared to an attribute that is related to a query included in a log of search queries. An indication of a category based on a detected relationship between an attribute associated with that category and the attribute of the electronic content is accessed. The identified category is compared to the indicated category, and the electronic content is included in a cache when the identified category matches the indicated category.

Receiving electronic content may include receiving electronic content having an attribute identifying a time period during which the electronic content may be cached. Comparing the attribute of the electronic content to an attribute of a query included in a log of search queries may include comparing the attribute identifying the time period to an attribute of a query from the log of search queries identifying a time period during which the query was submitted. Accessing an indication of a category may include an indication of a category based on a detected relationship between a time period associated with the category and the time period of the attribute of the electronic content. The attribute of a query from the query log includes may identify an hour within a day, a day within a week, a day within a month, a day within a year, a week within a month, a week within a year, or a month within a year during which the query was submitted. The attribute of the electronic content identifies an hour within a day, a day within a week, a day within a month, a day within a year, a week within a month, a week within a year, or a month within a year during which the electronic content may be cached.

Receiving electronic content may include receiving electronic content having an attribute identifying a characteristic of a user that submitted the request. Comparing the attribute of the electronic content to an attribute of a query included in a log of search queries may include comparing the attribute identifying the user characteristic to an attribute of a query from the log of search queries identifying a characteristic of a user that submitted the query. Accessing an indication of a category may include accessing an indication of a category based on a detected relationship between a user characteristic associated with the category and the user characteristic identified by the attribute of the electronic content. The attribute of a query from the query log may identify a gender of a user that submitted the query, an age of the user that submitted the query, or a location of the user that submitted the query. The attribute of the electronic content may identify a gender of a user for which the electronic content may be cached, an age of the user for which the electronic content may be cached, or a location of the user for which the electronic content may be cached.

The electronic content may include search results retrieved for a search query that is representative of the identified category of the electronic content.

Queries from the query log having an attribute that matches the attribute of the electronic content may be identified. For each of the identified queries, a category to which the identified query corresponds may be identified. For each category corresponding to one of the identified queries, a probability that the category corresponds to one of the identified queries may be identified. Accessing an indication of a category may include accessing an indication of a category with a high probability.

Identifying a category corresponding to the identified query may include accessing, for each category, a list of queries that correspond to the category. A category may be identified as corresponding to the identified query when at least a portion of the identified query matches at least a portion of one of the queries included in the list of queries that correspond to the category.

The electronic content may have multiple attributes, each query included in the log of search queries may have multiple attributes, the electronic content may be represented by multiple categories, and each query included in the query log may be represented by multiple categories. Receiving electronic content may include receiving the electronic content having multiple attributes. Identifying a category to which the electronic content corresponds may include identifying multiple categories to which the electronic content corresponds. Comparing the attribute of the electronic content to an attribute of a query included in a log of search queries may include comparing the multiple attributes of the electronic content to multiple of a query included in a log of search queries. Accessing an indication of a category may include accessing an indication of a category based on detected relationships between multiple attributes associated with the category and the multiple attributes of the electronic content.

In another general aspect, a computer program stored on a computer-readable medium that, when executed, generates a graphical user interface on a display device.

The graphical user interface includes a first display, presented in satisfaction of a request having a first attribute, of first electronic content. A second display of second electronic content is presented in satisfaction of a request having a second attribute. The first electronic content includes an advertisement that is representative of a category of queries from a query log that represents a typical query related to the first attribute and the second electronic content includes electronic content that is representative of a category of queries from a query log that represents a typical query related to the second attribute.

Implementations may include one or more of the following features. For example, the first attribute may match the second attribute, or the first attribute may differ from the second attribute.

These general and specific aspects may be implemented using a system, a method, or a computer program, or any combination of systems, methods, and computer programs.

Other features will be apparent from the description and drawings, and from the claims.

DESCRIPTION OF DRAWINGS

FIGS. 3A and 3B are block diagrams illustrating exemplary categories included in the ontology of FIGS. 2A and 2B.

FIGS. 5A-5E are block diagrams of tables identifying categories typical of search queries having differing attributes.

FIG. 10 illustrates an exemplary interface for retrieving search results for a query after the query has been resolved to correspond to a single query category.

FIG. 12 illustrates another exemplary interface for retrieving search results for a query that has been formatted to be representative of a query category.

DETAILED DESCRIPTION

Electronic content is managed based on a log of queries that are representative of multiple categories. The query log is processed to identify, for each or every of several time periods and/or for each demographic of users that may provide a query (e.g., query string) from the query log, one or more query categories that represent typical queries from the query log that were submitted by a user representative of the demographic during the time period. The processed query log may be used when providing electronic content. For example, content, such as advertisements, that is provided during a time period to a user of a particular demographic may correspond to one or more categories that represent typical queries submitted during the time period by users of the particular demographic. Search queries may be resolved to refer to the one or more categories, supplemented with information describing the one or more categories, or routed to information sources corresponding to the one or more categories. In addition, caching of electronic content may be based on the log of queries. For example, electronic content may be cached when the content corresponds to the one or more categories.

Figure 1A:
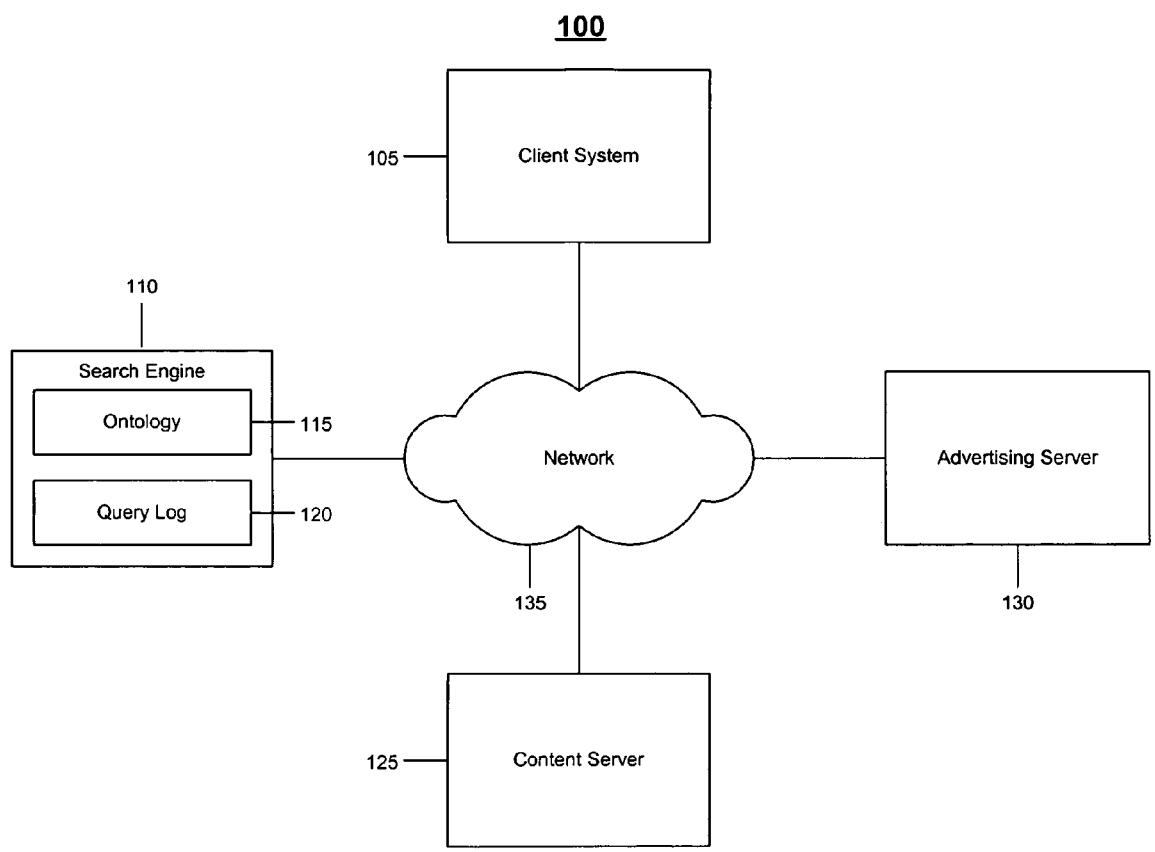
FIGS. 1A and 1B are block diagrams illustrating exemplary networked computing environments.

Referring to FIG. 1A, an exemplary networked computing environment 100 enables a user to access electronic content. For example, during a particular time period, the networked computing environment 100 enables a user that is representative of a particular demographic to access electronic content that is representative of a category of queries from a query log that were submitted by users of the particular demographic during the particular time period. Client systems 105 are manipulated by users to provide a search query to a search engine 110 that performs a search for particular Internet resources that match the search query. The search engine 110 includes an ontology 115 that is used to categorize the queries and a query log 120 that includes data indicative of queries that have been submitted to the search engine 110. The user also may request electronic content from a content server 125 and an advertising server 130. A network 135 interconnects the client system 105, the search engine 110, the content server 125, and the advertising server 130.

The client system 105 includes one or more communications programs that may be used by the user to submit search queries for the particular Internet resources to the search interface 110. The communications programs may include a web browser, an e-mail program, an instant messaging program, a file transfer protocol (FTP) program, or another communications program. The client system 105 also may include one or more input devices, such as a keyboard, a mouse, a stylus, a camera, or a microphone, with which the user may specify the search queries. The client system 105 also includes one or more output devices, such as a monitor, a touch screen, speakers, or a printer, with which electronic content may be presented to the user. The client system 105 also may be configured to communicate with other components of the networked computing environment 100.

The search engine 110 receives queries specified by users of client systems, such as the client system 105. The search engine 110 identifies Internet resources that match a query that has been received from the user. The search engine 110 may identify the matching Internet resources using one or more databases that include indexes of Internet resources.

The indexes may include keywords or descriptions of Internet resources that are matched against the received query. If the keywords or description for an Internet resource matches the search query, then the Internet resource is identified as a search result for the received query. The search engine 110 may be configured to match the received query against all possible Internet resources indexed in the databases, or against the Internet resources indexed in the databases that are from a particular source.

The ontology 115, which also may be called a query ontology, relates search queries to categories of search queries. The ontology 115 may categorize a very large number of search queries into a relatively small number of categories of search queries. The ontology 115 also may identify one or more keywords for each of the categories of search queries. The keywords for a category may represent words or phrases that appear in a high percentage of search results for queries corresponding to the category. In some implementations, the ontology 115 may identify one or more expert domains for each of the categories of search queries, which represent domains from which a high percentage of search results for queries corresponding to each particular category are identified. The structure of the ontology 115 will be described in further detail with respect to FIGS. 2A, 2B, 3A, and 3B.

The search engine 110 stores the queries received from the users of the client systems 105, or data indicative thereof, in the query log 120. In one implementation, the query log 120 includes the queries, times at which the queries were submitted, and demographic information describing users that submitted the queries. The demographic information describing a user may include one or more attributes of the user, such as a gender of the user, an age of the user, and an indication of a location of the user, such as a zip code of the user's home address. The demographic information associated with a query identifies a type of user that submitted the query.

The search engine 110 may process the query log 120 using the ontology 115 to identify a query category for each of the queries included in the query log 120. Based on the identified query categories and the time and demographic information included in the query log 120, the search engine 110 may identify one or more categories that are likely to represent a query from the query log 120 that was submitted during a particular time period by a particular type of user. The manner in which the search engine 110 processes the query log 120 will be discussed in further detail below with respect to FIG. 4.

The content server 125 and the advertising server 130 provide electronic content to the client system 105 for presentation to a user of the client system 105 in response to a request from the user. For example, the content server 125 may provide web pages, electronic messages, such as e-mail messages and instant messages, audio data, video data, electronic files, or other electronic content to the client system 105. Similarly, the advertising server 130 may provide electronic advertisements to be included in the electronic content provided by the content server 125, or to be presented separately. In one implementation, the request may include one or more attributes identifying a time at which the request is submitted to one of the servers 125 or 130 and demographic information describing the user of the client system 105 that submitted the request. The content provided by the servers 125 and 130 maybe category-specific, and the servers 125 and 130 may access the indications of one or more categories that are likely to represent a query from the query log 120 that was submitted during a time period in which the request was received by a type of user from which the request was received. In one implementation, the servers 125 and 130 provide electronic content that is representative of the accessed categories.

The network 135 may be a network that connects the components of the networked computing environment 100, such as the Internet, the World Wide Web, wide area networks, (WANs), local area networks (LANs), analog or digital wired and wireless telephone networks (e.g. a public switched telephone network (PSTN), an integrated services digital network (ISDN), or a digital subscriber line (xDSL)), radio, television, cable, satellite, and/or any other delivery mechanism for carrying data. The components of the networked computing environment 100 are connected to the network 135 through communications pathways that enable communications through the network 135. Each of the communication pathways may include, for example, a wired, wireless, cable or satellite communication pathway, such as a modem connected to a telephone line or a direct internetwork connection. The components of the networked computing system 100 may use serial line internet protocol (SLIP), point-to-point protocol (PPP), or transmission control protocol/internet protocol (TCP/IP) to communicate with one another over the network 135 through the communications pathways.

Each of the components of the networked computing environment 100 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, that is capable of being delivered to the components.

Further, each of the components of the networked computing environment 100 includes a communications interface used send communications through network 135. The communications may include, for example, e-mail messages, instant messages, audio data, video data, general binary data, or text data (e.g., encoded in American Standard Code for Information Interchange (ASCII) format).

Figure 1B:
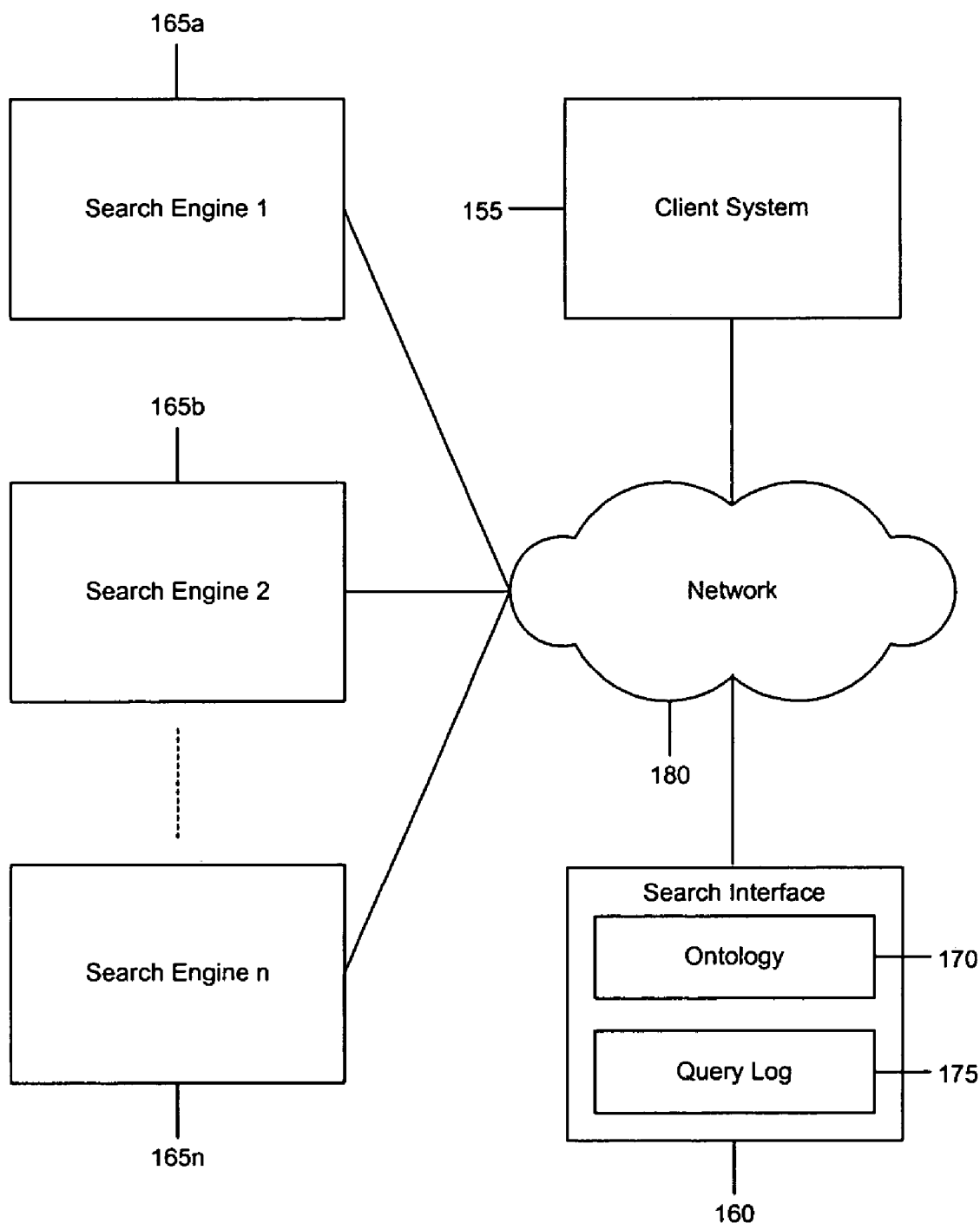

Referring to FIG. 1B, another exemplary networked computing environment 150 that enables a user to search for particular Internet resources is similar to the networked computing environment 100 of FIG. 1A. Client systems 155 are manipulated by users to provide a query to a search interface 160 through which a search for particular Internet resources is performed. The search interface 160 submits the query to one or more search engines 165a-165n. An ontology 170 and a query log 175 are used to disambiguate and reformulate the query before submission to one or more of the search engines 165a-165n. A network 180 interconnects the client system 155, the search interface 160, and the search engines 165a-165n.

The client system 155 is similar to the client system 105 of FIG. 11A. The ontology 170 is similar to the ontology 115 of FIG. 1A, and the query log 175 is similar to the query log 120 of FIG. 1A. Each of the search engines 165a-165n is similar to the search engine 110 of FIG. 1A. However, the search engines 165a-165n differ from the search engine 110 in that the search engines 165a-165n do not maintain a local query log. The network 180 is similar to the network 135 of FIG. 1A.

The search interface 160 receives queries specified by the user from the client system 155. The search interface 160 may modify the queries and may submit the queries to particular ones of the search engines 165a-165n in order to retrieve search results for the received queries that represent search results desired by the user. For example, the search interface 160 may identify a query category that typically represents queries submitted at a time at which the query was received by a type of user from which the query was received. The query may be disambiguated such that the query corresponds only to the identified category. In addition, the query may be reformulated with one or more keywords typically found in search results for queries of the identified category. Furthermore, the search interface 160 may submit the received query only to particular ones of the search engines 165a-165n that typically return search results for queries of the identified category. Modifying the received query and submitting the received query only to particular ones of the search engines 165a-165n based on the identified category of the query cause search results that are retrieved for the received query to be representative of the identified category.

The search interface 160 also may maintain and process the query log 175 in a manner similar to how the search engine 110 maintained the query log 120 of FIG. 1A. In one implementation, the search engines 165a-165n may provide the search interface 160 with indications of the search queries that were received by the search engines 165a-165n for inclusion in the query log 175. In another implementation the search interface 160 may store search queries in the query log 175 before forwarding the queries to the search engines 165a-165n. Maintaining and processing the query log 175 at the search interface 160 prevents the search engines 165a-165n from having to do so themselves. In other words, maintaining and processing the query log 175 at the search interface 160 reduces the functionality required in each of the search engines 165a-165n.

Furthermore, maintaining the query log 175 at the search interface 165 or another hosted location, such as one of the search engines 165a-165n, prevents the client system 155 from having to locally maintain and process the query log 175, thereby reducing the functionality required in the client system 155. However, in some implementation, the query log 175 and the ontology 170 may be located at the client system 155, and the client system 155 may be configured to maintain and process the query log 175. In such implementations, the query log 175 may include queries submitted by users of the client system 155.

The central query log 175 includes a larger number of queries than would be stored in an individual query log maintained by one of the search engines 165a-165n or the client system 155. Consequently, the central query log 175 may be better equipped or informed to identify one or more categories that are likely to represent a query that was submitted during a particular time period by a particular type of user.

Figure 2A:
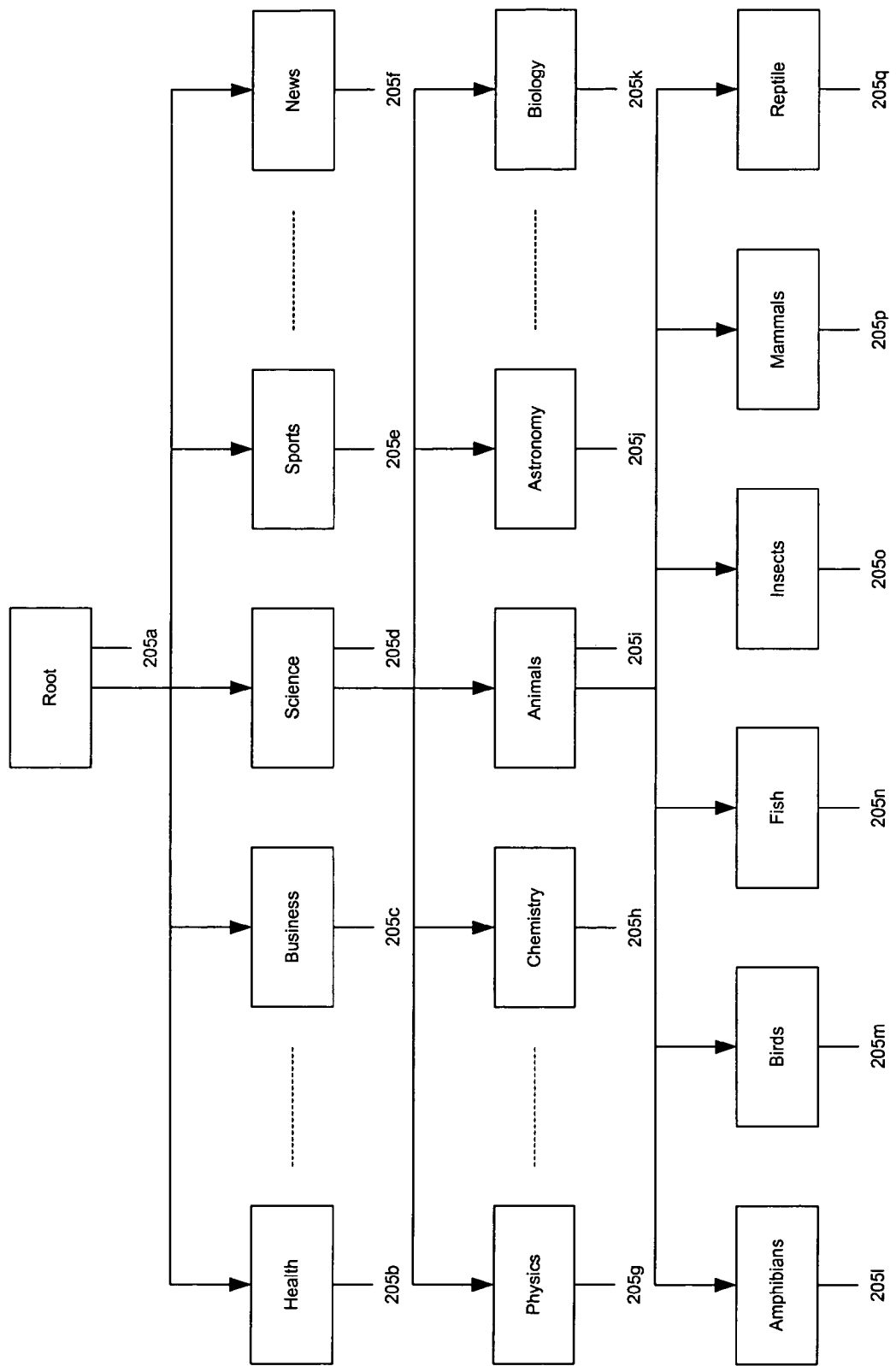
FIGS. 2A and 2B are block diagrams illustrating an exemplary ontology that relates queries to query categories.
Figure 2B:
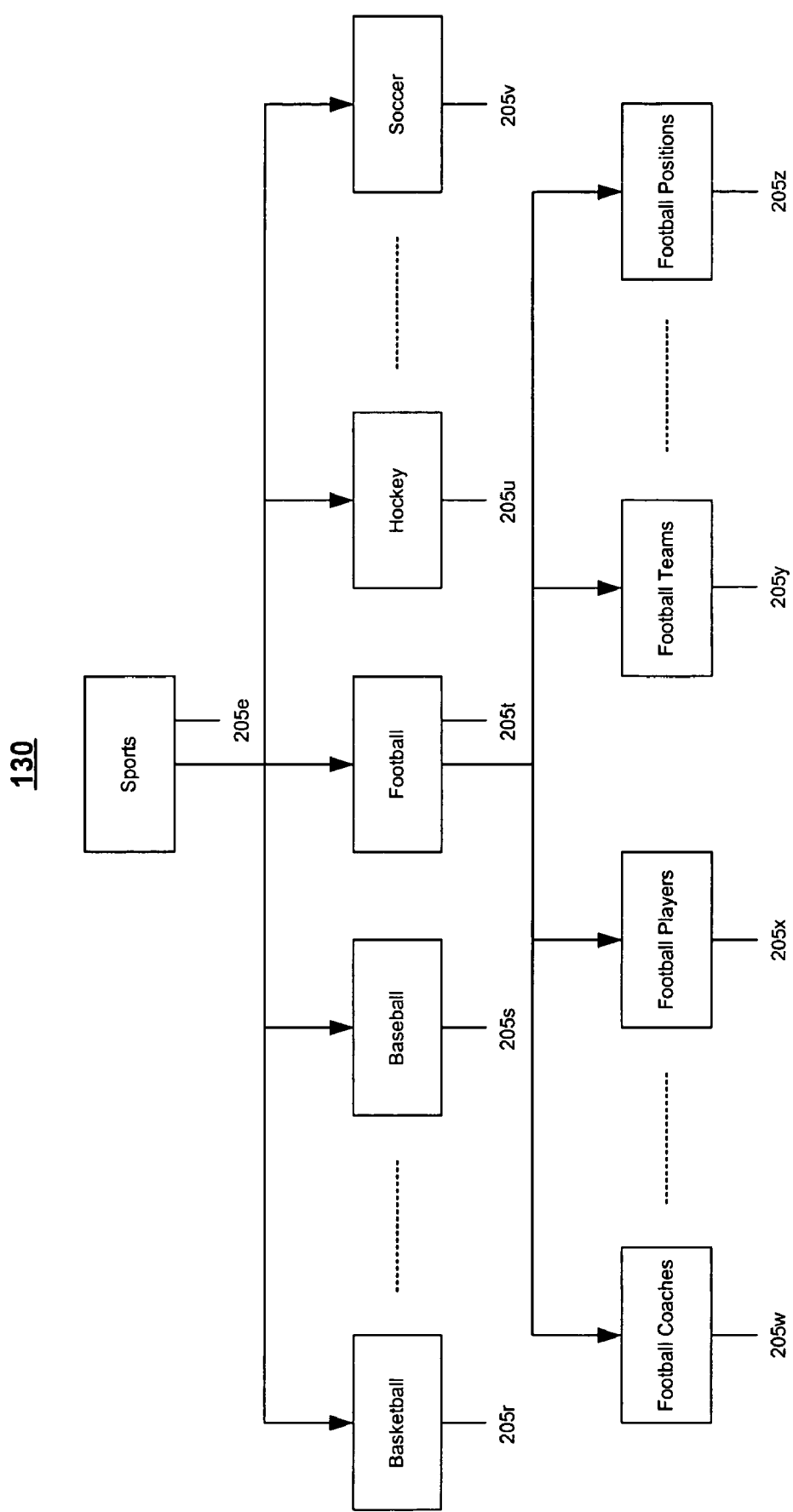

Referring to FIGS. 2A and 2B, a portion of one implementation of the ontology 115 of FIG. 1A includes categories 205a-205z that are arranged as nodes in a directed acyclic graph. Each of the categories 205a-205z is associated with one or more queries that are representative of the category. The queries that are associated with one of the categories 205a-205z may be referred to as included in the category. Each of the categories 205a-205z also may be associated with one or more keywords and one or more expert domains for the category. The keywords represent words or phrases that appear in a high percentage of search results for queries associated with the category, and the expert domains represent domains from which a high percentage of search results for queries corresponding to the category are identified.

When a first category appears above a second category in the ontology 115, the first category may be referred to as a parent category of the second category, and the second category may be referred to as a child category of the first category. For example, in relative terms, the science category 205d is a parent category, and the categories 205g-205k are children categories of the science category 205d. In general, an arrow directly from a first category to a second category indicates that the first category is a parent category of the second category. More generally, one or more arrows from a first category to a second category through one or more intermediate categories indicate that the first category is an ancestor category of the second category, and that the second category is a child category of the first category.

A parent category includes queries that are more general than queries included in a child category of the parent category. For example, the science category 205d is more general than the children categories 205g-205k, which include forms or subsets of science such as the physics category 205g, the chemistry category 205h, the animals category 205i, the astronomy category 205j, and the biology category 205k. Queries associated with a particular category may be referred to as corresponding to the particular category, as well as to other categories included in the ontology 115 that are ancestor or child categories of the particular category. Furthermore, categories that are ancestor or child categories of a category that includes a particular query may be referred to as corresponding to the particular query. In the implementation of the ontology 115 illustrated in FIGS. 2A and 2B, each of the categories 205a-205z has only one parent category. However, in other implementations of the ontology 115, each of the categories 205a-205z may have any number parent categories and any number of child categories.

In some implementations, some of the categories 205a-205z are not associated with keywords or expert domains. In such implementations, keywords and expert domains for those categories may be keywords and expert domains associated with one or more ancestor or child categories of those categories. For example, if no keywords and expert domains are associated with the reptile category 205q, keywords and expert domains from the animals category 205i, the science category 205d, or the root category 205a may be used for the reptile category 205q. When keywords and expert domains are associated with a child category and with an ancestor category of the child category, keywords and expert domains from the ancestor category may be used in place of, or in addition to, the keywords and the expert domains for the child category.

In other implementations of the ontology 115, the categories 205a-205z are not arranged as nodes in a directed acyclic graph such that relationships do not exist between the categories 205a-205z. As a result, keywords and expert domains for a query may be identified only from a category with which the query is associated. In such implementations, keywords, and expert domains may associated with all of the categories 205a-205z.

FIGS. 3A and 3B illustrate exemplary categories 205m and 205y from the ontology 115. The birds category 205m is a child category of the animals category 205i, the science category 205d, and the root category 205a. The football team category 205y is a child category of the football category 205t, the sports category 205e, and the root category 205a. The categories 205m and 205y include names 305a and 305b and associated query lists 310a and 310b, respectively. In this example, the category 205m is named "Birds" and is associated with queries that include "eagle," "robin," "cardinal," and "blue jay," and the category 205y is named "Football Teams" and is associated with queries that include "Washington Redskins," "Baltimore Ravens," and "Philadelphia Eagles." The queries listed in the query lists 310a and 310b may be associated with the categories 205m and 205y manually or through automatic processes that identify appropriate categories for queries.

The categories 205m and 205y may be associated with keyword lists 315a and 315b, respectively. The keywords included in the keyword list 315a represent words or phrases that appear in a high percentage of search results for the queries included in the query list 310a. Similarly, the keywords included in the keyword list 315b represent words that frequently appear in search results for the queries included in the query list 310b. In this example, the keyword list 310a includes the keywords "bird," "nest," "egg," "beak," and "talon," and the keyword list 310b includes the keywords "football," "game," "coach," "quarterback," and "receiver."

The categories 205m and 205y also may be associated with expert domain lists 320a and 320b. The expert domains included in the expert domain list 320a represent domains from which a high percentage of search results for the queries included in the query list 310a are retrieved. Similarly, the expert domains included in the expert domain list 320b represent domains from which a high percentage of search results for the queries included in the query list 310b are retrieved. In this example, the expert domain list 320a includes the domains "www.hbw.com," "birdingonthe.net," "home.planet.nl," "www.mangoverde.com," "www.camacdonald.com," "www.birdforum.net," "ww.bird-stamps.org," "www.phthiraptera.org," "www.scricciolo.com," and "www.birdlife.net," and the domain list 320b includes the domains "www.nfl.com" and "www.football.com."

Both of the query lists 315a and 315b include a query that includes the word "eagle." As a result, when a query that includes the word "eagle" is received from the client system 105 of FIG. 1A, or is accessed from the query log 120, both the category 205m and the category 205y will be identified as corresponding to the received query. Such an identification may be made because "eagles" matches the query "eagle" from the query list 310a and the query "Philadelphia Eagles" from the query list 310b. In other words, the query may ambiguously correspond to both of the categories 205m and 205y, even though a user from which the query was received may have intended only one of the queries 205m and 205y for the query.

Figure 4:
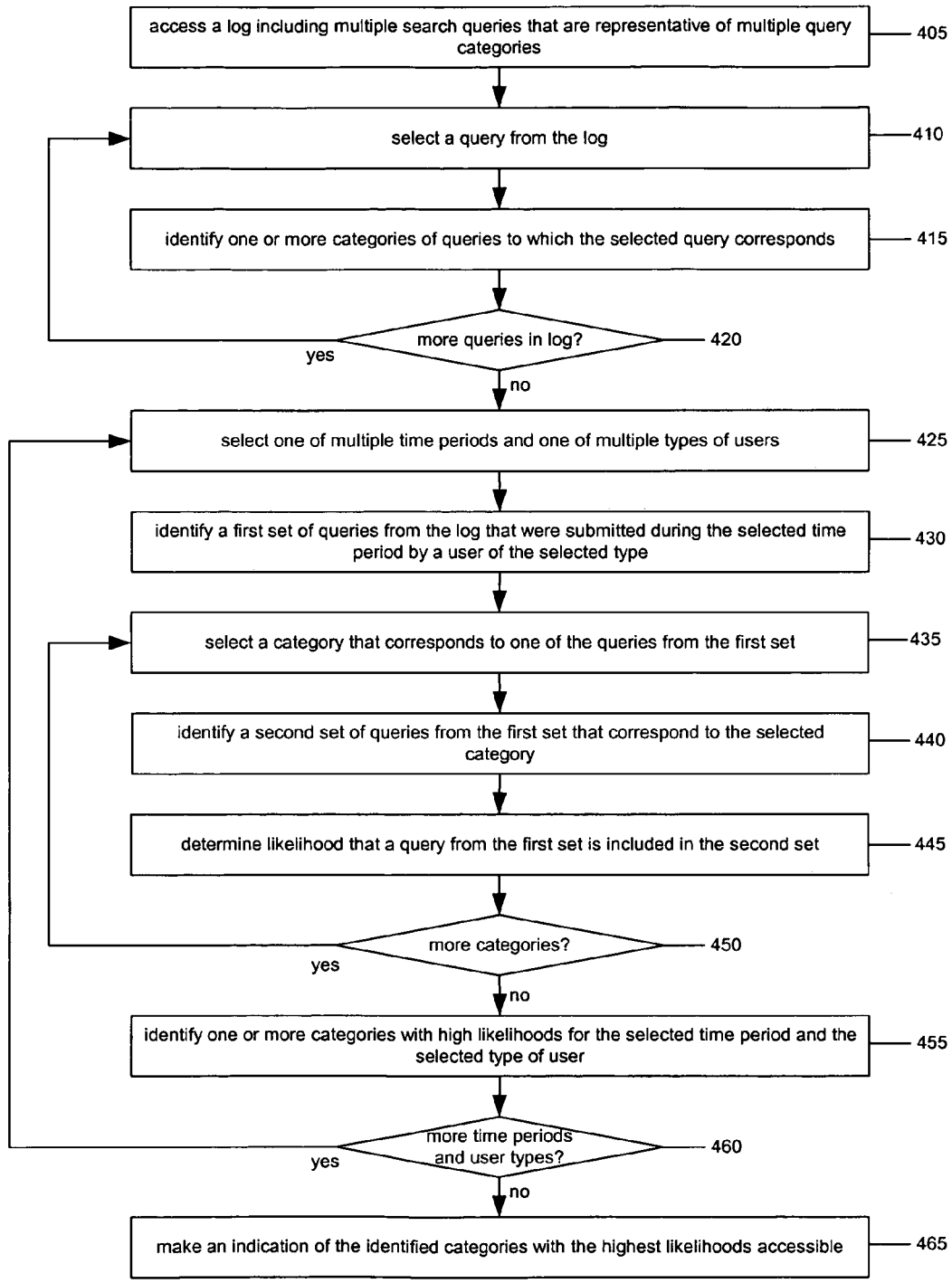
FIG. 4 is a flow chart illustrating an exemplary process for identifying typical categories of search queries from a query log.

Referring to FIG. 4, a process 400 is applied to a log of queries indicating queries that were submitted to one or more search engines. Generally, the query log is processed to identify one or more query categories that typically represent queries from the query log that were submitted during each of multiple time periods by each of multiple types of users. The process 400 may be executed by a search engine to which the queries were submitted, such as the search engine 110 of FIG. 1A. Alternatively or additionally, the process 400 may be executed by a provider of electronic content, such as the content server 125 or the advertising server 130 of FIG. 1A. In one implementation, the process 400 is executed periodically, and results of the execution of the process 400 are accessed when content is requested subsequently. In another implementation, the process 400 is executed each time a request for electronic content is received. In such an implementation, only relevant portions of the query log (e.g., queries submitted during a time period during which the electronic content was requested) may be processed. For ease of discussion, the process 400 will be described as being executed by the search engine to process the entire query log.

More specifically, the search engine accesses a log indicating queries that are representative of multiple categories of queries, such as the query log 120 of FIG. 1A (405). The accessed log may include, for each of the multiple queries, an indication of a time at which the query was submitted and an indication of attributes for the user or user type that submitted the query. The search engine selects a query from the log (410) and identifies one or more categories to which the selected query corresponds (415). For example, the search engine may use an ontology, such as the ontology 115 of FIG. 1A, to identify the categories. More particularly, the search engine matches the selected query against the queries associated with the categories included in the ontology. If a particular category corresponds to a query that matches at least a portion of the selected query, then the particular category corresponds to the selected query.

The search engine determines if there are more queries in the accessed log that have yet to be categorized (420). If so, then the search engine selects a different query from the log (410) and identifies one or more categories of queries to which the different query corresponds (415). In this manner, the queries included in the accessed log are categorized sequentially.

After all of the queries have been categorized, the search engine selects one of multiple time periods during which a query from the query log was submitted and one of multiple attributes or types of users that submitted a query from the query log (425). For example, the multiple time periods may include the hours of a day, and the search engine may select one of the hours of the day (e.g., from 12:00 P.M. to 1:00 P.M.) or special days or weeks in a year (e.g., holidays). The multiple time periods also may include the days of a week, a month, or a year, the weeks of a month or a year, the months of a year, or different time periods within a day (e.g., morning, afternoon, evening, and night). The multiple types of users may depend on the age, gender, and location of the users. For example, one type of user may include teenage boys in New York City, while another type of user may include women between the ages of 20 and 30 in California.

The search engine identifies a first set of queries from the log that were submitted during the selected time period by a user of the selected attributes or types (430). For example, the search engine may sequentially access each query from the log and determine whether the indication of the time at which the query was submitted falls within the selected time period and whether the indication of attributes for the user or user type that submitted the query matches the selected attributes. If so, then the query is added to the first set.

The search engine also selects a category that corresponds to one of the queries from the first set (435). The search engine identifies a second set of queries from the first set that correspond to the selected category (440). To do so, the search engine may sequentially access each query from the first set and determine whether the previously determined category of the query matches the selected category. If so, then the query is added to the second set. Because only queries from the first set may be included in the second set, the second set is a subset of the first set.

The search engine determines a likelihood that a query from the first set is included in the second set (445). In one implementation, determining the likelihood includes determining the probability that a query is included in the second set given that the query is included in the first set. Such a probability may be calculated, for example, by dividing the number of queries included in the second set by the number of queries in the first set. The search engine also may use alternative calculations to determine the probability.

The search engine determines whether probabilities of corresponding to queries from the first set are to be calculated for more query categories (450). If so, then the search engine selects a different query category (435), identifies a second set of queries from the first set that correspond to the different category (440), and determines a likelihood that a query from the first set is included in the second set (445). In this manner, a probability may be determined sequentially for each of the categories to which queries from the first set correspond. After likelihoods of corresponding to queries from the first set have been determined for each of the categories, the search engine identifies one or more categories with high likelihoods for the selected time period and the selected attribute/type (hereinafter "type") of user (455). In other words, the search engine may identify the categories with associated probabilities that exceed a threshold. The identified categories represent categories that correspond to typical queries from the log that were submitted during the selected time period by users of the selected type. More generally, the identified categories may represent categories of electronic content that typically is requested, retrieved, provided, or presented during the selected time period to users of the selected type.

The search engine determines whether such categories are to be identified for more time periods and user types (460). If so, then the search engine selects a different time period and a different user type (425) and identifies one or more categories with high likelihoods of corresponding to queries from the log that were submitted during the different time period by a user of the different user type (430-455). In this manner, one or more categories are identified for each of the time periods during which the queries from the log were submitted and for each of the types of users that submitted the queries from the log.

The search engine then makes an indication of the categories identified for each of the multiple time periods and for each of the multiple user types accessible for use in managing how electronic content is requested, retrieved, provided, or presented (455). In one implementation, the queries included in the query log may be categorized upon addition into the query log. Each query may be stored in the query log with an indication of one or more categories to which the query corresponds. In such an implementation, the queries do not need to be categorized during the process 400. In other words, the queries need not be selected from the log and categorized sequentially (405-420). Instead, the stored indication of the categories corresponding to a query may be accessed when identifying whether a query corresponds to a selected category (440). The indications may include the previously determined likelihoods for the identified categories. The search engine may store the indication of the identified categories locally in a location that is accessible to the electronic content providers. Alternatively or additionally, the search engine may send the indication of the identified categories to the electronic content providers.

In one implementation, the indications of the identified categories may be organized as a table, such as those depicted in FIGS. 5A-5E, or as a corresponding logical data structure that may be accessed by systems that manage electronic content based on the query log. The table may relate the multiple time periods and the multiple types of user to indications of the categories that were identified for the multiple time periods and the multiple types of user.

Specifically, referring to FIGS. 5A-5E, tables 500, 520, 540, 560, and 580 store indications of one or more categories that represent typical queries submitted during each of multiple time periods and/or by each of multiple types of user. The tables 500, 520, 540, 560, and 580 may be generated and made accessible to content providers through execution of the process 400 of FIG. 4. Each of the columns of the tables 500, 520, 540, 560, and 580 correspond to an attribute related to a search query or a category of search query. Each row of the tables 500, 520, 540, 560, and 580 stores an indication of one or more categories that represent typical queries related to a particular attribute identified by the row.

For example, the table 500 identifies a category that is typical of search queries submitted during each of multiple time periods, such as the hours of a day. The table 500 indicates that search queries submitted between 9 A.M. and 10 A.M. typically correspond to category "W."

Similarly, the table 520 identifies a category that is typical of search queries submitted during each day of the week. For example, the table 520 indicates that the category "D" typically represents queries submitted on Tuesday.

The table 540 identifies a category that is typical of search queries submitted during each type of day (e.g., weekday, weekend, holiday). The illustrated table 540 identifies categories that are typical of search queries submitted on specific holidays. For example, the table 540 indicates that the category "E" typically represents queries submitted on Easter.

The table 560 identifies multiple categories that are typical of search queries submitted during multiple parts of a day (e.g., morning, afternoon, evening, and night). For example, the table 580 indicates that in the afternoon, search queries are typically represented by categories "A," "H," and "G." The categories indicated by a row may be sorted, such that the category that appears in the column labeled "Category 1" may more likely represent a query submitted during a particular time period than the category that appears in the column labeled "Category 2."

The table 580 represents a category that is typical of queries having particular values for multiple attributes. The multiple attributes may identify time periods during which the search queries were submitted and characteristics of users that submitted the queries. For example, the table 580 indicates that a "news" category typically represents queries submitted during the evening by adult males.

Figure 6:
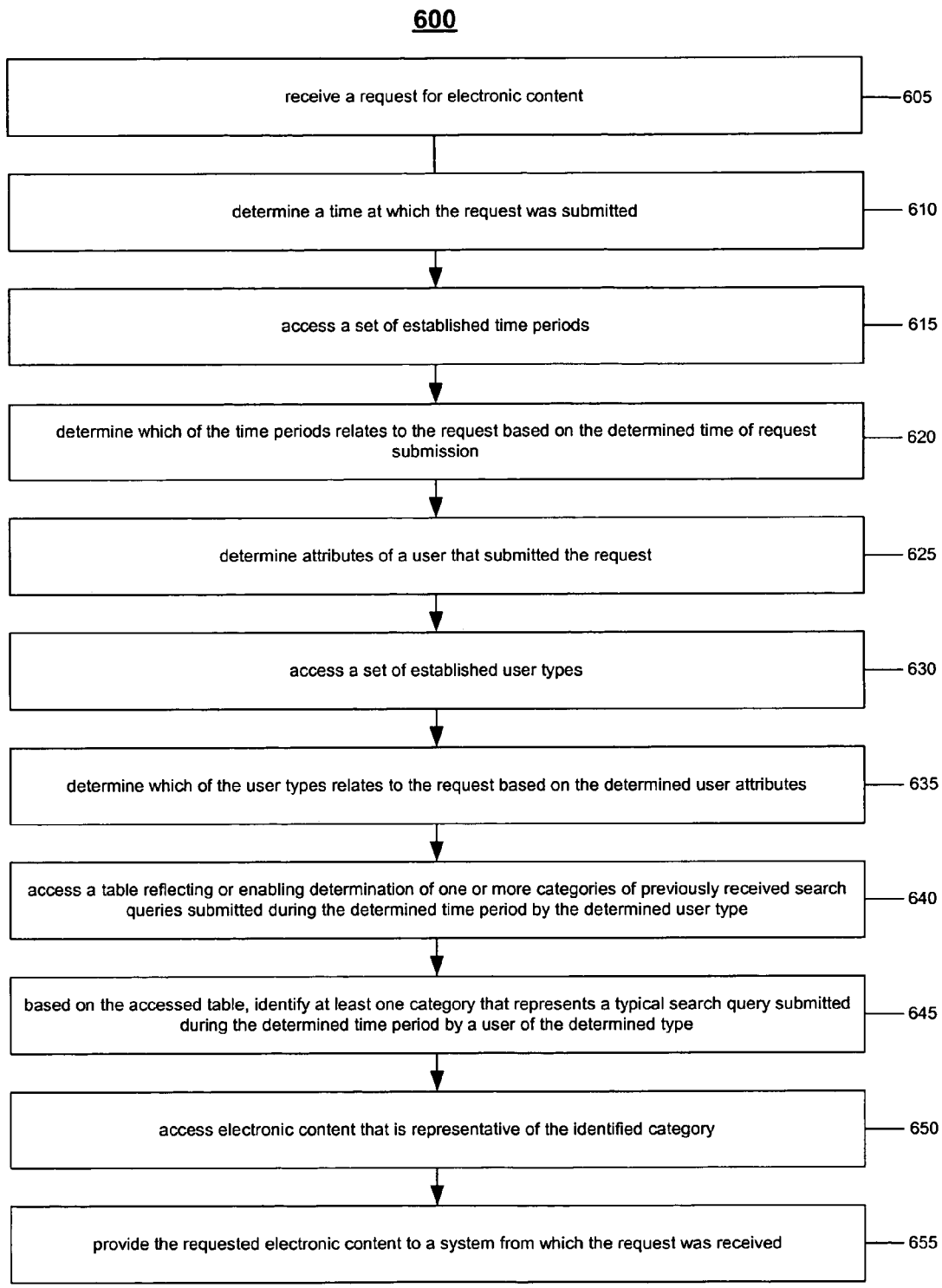
FIG. 6 is a flow chart illustrating an exemplary process for providing category-specific electronic content.

Referring to FIG. 6, a process 600 is used to identify and provide electronic content that is representative of a category of electronic content that is popular at a time at which the electronic content is requested among users that request the electronic content, where the popularity of a category for a type of user during a time period is indicated based on an analysis of search queries submitted during the time period by users of the type that are representative of the category. The process 600 is executed by a provider of electronic content, such as the search engine 110, the content server 125, or the advertising server 130 of FIG. 1A.

The electronic content provider receives a request for electronic content (605). The electronic content may include a web page, an advertisement, an e-mail message, an instant message, a file, or another piece of electronic content.

Alternatively or additionally, the electronic content may include search results, in which case the request may be a search query for which the search results are retrieved. The request may be received from a client system on which the requested electronic content is to be displayed, such as the client system 105 of FIG. 1A. Alternatively, the request may be received form another provider of electronic content that uses content from the electronic content provider.

The electronic content provider determines a time at which the request was submitted (610). The request may include an indication of the time as an attribute of the request, in which case the time may be identified from the request. Alternatively or additionally, the time may be a time at which the request was received by the electronic content provider. The electronic content provider accesses a set of established time periods, such as the hours in a day or the days in a week (615). The electronic content provider determines which of the time periods relates to the request based on the determined time of request submission (620).

Similarly, the electronic content provider determines one or more attributes of a user that submitted the request (625). The request may include an indication of the user attributes as attributes of the request, in which case the user attributes may be identified from the request. The user also may have an account with the electronic content provider that indicates the attributes of the user. Consequently, the electronic content provider may access the account to identify the attributes. The electronic content provider accesses a set of established user types, such as one or more user demographics (630). The electronic content provider determines which of the user types relates to the request based on the determined user attributes (635).

The electronic content provider accesses a table reflecting or enabling determination of one or more categories of previously received search queries submitted during the determined time period by the determined user type (640). The accessed table may have been generated through a previous execution of the process 400 of FIG. 4. For example, the electronic content provider may access one of the tables 500, 520, 540, 560, or 580 of FIGS. 5A-5E. Based on the accessed table, the electronic content provider identifies at least one category that represents a typical search query submitted during the determined time period by a user of the determined type (645). For example, the electronic content provider may identify an entry in the table corresponding to the determined time period and the determined user type. The category indicated by the identified table entry is a category that represents a typical search query submitted during the determined time period by a user of the determined time.

In alternative implementations of the process 600 of FIG. 6 instead of accessing (640) and using (645) a table that was generated through a previous execution of the process 400 of FIG. 4, the electronic content provider may execute the process 400. In such implementations, rather than making the results of the new execution of the process 400 accessible as a table, the electronic content provider may use the results directly. In some of the alternative implementations, the electronic content provider may only execute portions of the process 400 that are relevant to the determined time period and the determined user type.

The electronic content provider accesses electronic content that is representative of the identified category (650). For example, electronic content that is accessed may include an advertisement that relates to the identified category. More particularly, if the identified category relates to electronics, the electronic content provider may access an advertisement for a merchant from which electronics may be purchased, or for a source of information describing electronics. Accessing the content may include accessing the content from a local store of category-specific electronic content, or retrieving the electronic content from a source of electronic content that is representative of the identified category. The accessed content may be provided to the client system that requested the electronic content for presentation (655).

Figure 7:
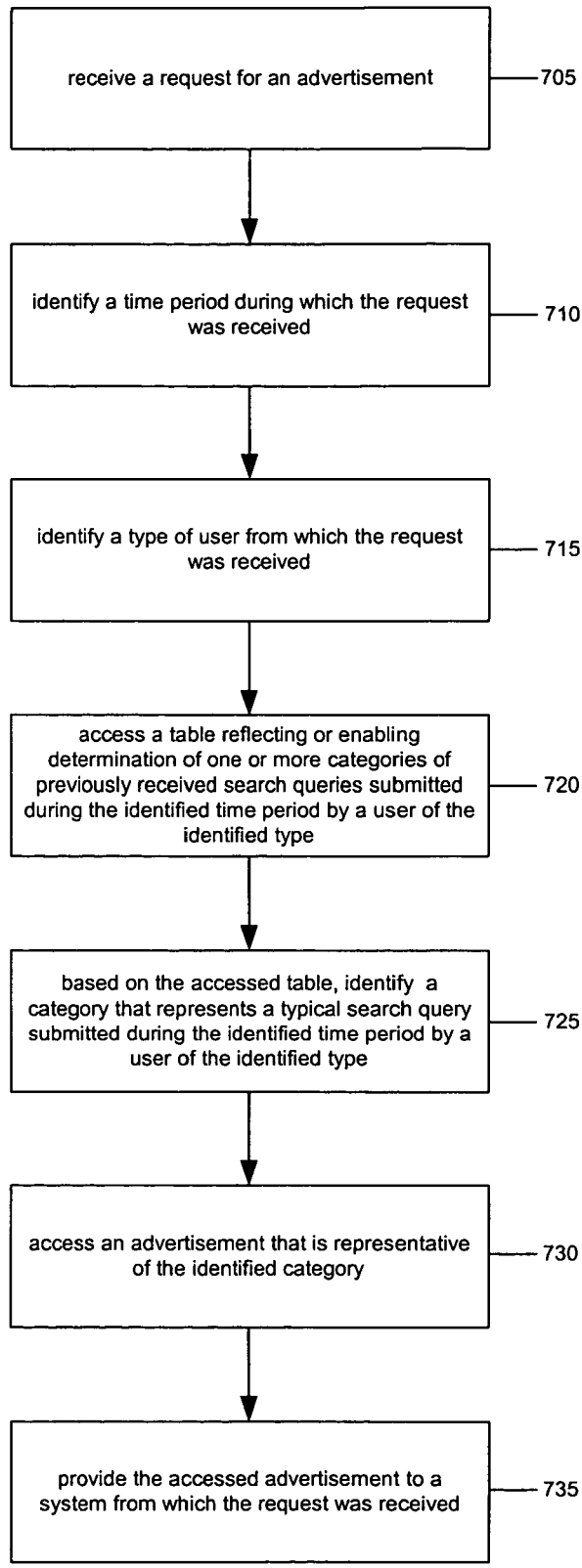
FIG. 7 is a flow chart illustrating an exemplary process for providing category-specific advertisements.

Referring to FIG. 7, a process 700 is used to identify and provide advertisements that are representative of a category of electronic content that appears from the search queries to be popular at a time corresponding to the time at which the electronic content is requested among users that request the electronic content. The process 700 represents one implementation of the process 600 of FIG. 6. The process 700 is executed by a provider of advertisements, such as the advertising server 130 of FIG. 1A.

The advertising server receives a request for an advertisement (705). In one implementation, the advertisement may be a standalone advertisement, such as a pop-up advertisement or a pop-under advertisement. In another implementation, the advertisement may be included in other electronic content. For example, the advertisement may be a banner or floating advertisement within a web page. In such an implementation, the request for the advertisement may be a request for the electronic content. The advertisement may be displayed as part of a graphical user interface, the request being generated when the interface is first displayed or at a later time.

The advertising server may receive the request from a client system on which the requested electronic content is to be displayed, such as the client system 105 of FIG. 1A. The request may be generated manually by a user of the client system, or automatically by an application or program operating on the client system. In implementations in which the advertisement is to be included in another piece of electronic content, the request for the advertisement may be received from a provider of the electronic content. For example, a user may submit a request for a web page that includes space for one or more advertisements. In such a case, the request may be the original request received from the user or a request from a provider of the web page for the one or more advertisements included in the web page.

The advertising server may identify a time period during which the request was received (710) and a type of user from which the request was received (715). The advertising server accesses a table reflecting or enabling determination of one or more categories of previously received search queries submitted during the identified time period by a user of the identified user type (720). Based on the accessed table, the advertising server identifies a category that represents a typical search query submitted during the identified time period by a user of the identified type (725). The advertising server accesses an advertisement that is representative of the identified category (730). The advertising server provides the requested electronic content, including the accessed advertisement (735). Such operations are performed in a similar manner as corresponding operations from the process 600 of FIG. 6.

Figure 8A:
FIGS. 8A and 8B illustrate an exemplary interface for presenting electronic content including category-specific advertisements.
Figure 8B:

Referring to FIGS. 8A and 8B, an interface 800 may be used to display electronic content 805 to a user. The electronic content 805 includes an advertisement 810. In FIGS. 8A and 8B, the electronic content 805 is displayed as a web page. In other implementations, the electronic content may be an alternative form of an electronic message, such as an e-mail message or an instant message, or another piece of electronic content to which the advertisement 810 has been added.

FIGS. 8A and 8B illustrate how a single interface 800 can be customized to generate different displays at different times, for example, because the user navigated to the web page at the different times. For example, the interface 800 of FIG. 8A was displayed at 12:36 P.M., and the interface 800 of FIG. 8B was displayed at 7:59 P.M. For purposes of illustration, assume that these different times correspond to different time periods for which different categories of queries were identified as being typical of queries submitted during the respective time periods, based on processing of a log of queries in accordance with the process 400 of FIG. 4, for example. More particularly, assume that the query log indicates that queries submitted between 12:00 P.M. and 1:00 P.M. typically relate to electronics, and that queries submitted between 7:00 P.M. and 8:00 P.M. typically relate to celebrity news. Consequently, when the electronic content 805 is provided for presentation at 12:36 P.M., the advertisement 810 is selected for presentation as shown in the interface 800 of FIG. 8A. In addition, when the electronic content 805 is provided for presentation at 7:59 P.M., celebrity news and gossip content is selected for presentation as shown in the interface 800 of FIG. 8B.

In some implementations, in addition to indicating a category of electronic content to be provided in response to a query, a log of queries may indicate a type of electronic content to be provided or other information related to the query. For example, the query log may be processed to identify a type of electronic content that is typical of search results for queries submitted during a particular time period and/or by users of a particular type. When providing electronic content during the particular time period to a user of the particular type, an indication of the identified type of content may be accessed, and content that is representative of the identified type may be provided to the user. For example, processing a query log may indicate that search results provided for queries submitted from 12 P.M. to 1 P.M. typically are from news-related web sites and that search results provided for queries submitted from 7 P.M. to 8 P.M. typically are online games. Consequently electronic content requested from 12 P.M. to 1 P.M. may be provided from news-related web sites, and online games may be provided in response to requests from 7 P.M. to 8 P.M.

Figure 9:
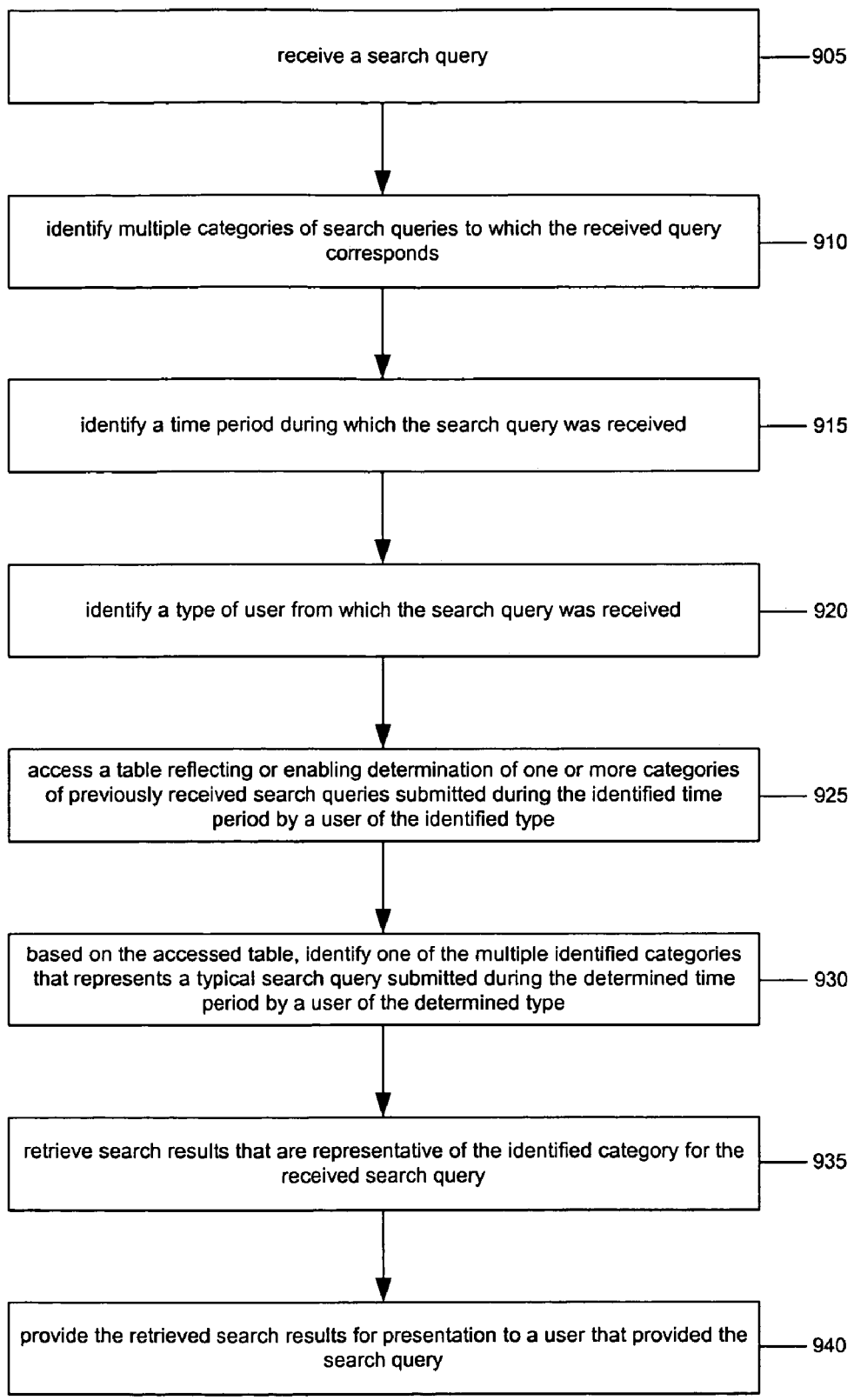
FIG. 9 is a flow chart illustrating an exemplary process for resolving a query that ambiguously corresponds to multiple categories of query.

Referring to FIG. 9, a process 900 is used to resolve a query received during a time period from a particular type of user to refer to a single query category. The category to which the query is resolved may be a category that typically corresponds to queries submitted during the time period by users of the particular type. The process 900 represents one implementation of the process 600 of FIG. 6. The process 900 is executed by a search engine, such as the search engine 110 of FIG. 1A or one of the search engines 165a-165n of FIG. 1B, or by a search interface, such as the search interface 160 of FIG. 1B. For ease of discussion, the process 900 will be described as being executed by a search engine.

The search engine receives a search query at a time corresponding to one of multiple time periods from a user corresponding to one of multiple types of user (905). The search query may be received from a client system that may access the search engine, such as the client system 105 of FIG. 1A. The search engine identifies multiple categories of search queries to which the received query corresponds (910). The search engine may identify the multiple categories using an ontology, such as the ontology 115 of FIG. 1A or the ontology 170 of FIG. 1B. In one implementation, the search engine matches the received query against the queries associated with the categories included in the ontology. If a particular category corresponds to a query that matches at least a portion of the received query, then the particular category and other categories related to the particular category in the ontology correspond to the received query.

The search engine may identify a time period during which the search was received (915) and a type of user from which the search query was received (920). The search engine accesses a table reflecting or enabling determination of one or more categories of previously received search queries submitted during the identified time period by a user of the identified user type (925). Based on the accessed table, the search engine identifies one of the multiple categories that represents a typical search query submitted during the identified time period by a user of the identified type (930). For example, the search engine may use the accessed table to identify a category that represents a typical search query submitted during the identified time period by a user of the identified type. The search engine then may determine which of the multiple categories matches the category identified from the accessed table.

The search engine retrieves search results that are representative of the identified category for the received search query (935). To do so, the search engine may supplement the query with information associated with or identifying the identified category. Supplementing the query with the information causes the query to correspond to only the identified category. In other words, supplementing the query resolves the query to the identified category. The received query may be supplemented such that the supplemented query is not perceivable. The search engine may retrieve search results for the supplemented query, or may provide the supplemented query to one or more search engines such that the one or more search engines may retrieve search results for the supplemented query. Before submitting the query to a search engine, the supplemented query may be reformulated to adhere to a syntax in which the search engine accepts queries.

Supplementing the query with information associated with or identifying the identified category may include formatting the query into a canonical form of the received query for the identified category. The canonical form of the entered query for the identified category is a query associated with the identified category that matches the entered query. When the query does not exactly match a query associated with the identified category, then the canonical form of the query differs from the query. For example, the query "eagles" matches the query "Philadelphia Eagles," which is associated with the football category. Consequently, "Philadelphia Eagles" may be the canonical form of the query "eagles" for the football category.

Alternatively or additionally, the query may be supplemented with one or more keywords associated with the identified category. The keywords represent words or phrases found in a high percentage of search results for queries associated with the identified category. The keywords may be associated with the identified category or a category related to the identified category in the ontology. The query may be supplemented with the keywords such that search results retrieved for the supplemented query include at least one of the keywords.

The search engine provides the retrieved search results for presentation to a user that provided the search query (940). For example, the search results may be provided to the client system from which the search query was received originally.

The client system may present the search results to a user that specified the search query on the client system.

Referring to FIG. 10, a search tool user interface 1000 may be presented to a user of the client system 155 of FIG. 1B by the search interface 160 of FIG. 1B when accessed. For example, the search tool user interface 1000 may be a web page sent to the client system 155 by the search interface 160 in response to a request from the client system 155. The client system 155 may present the search tool user interface 1000 to the user with a web browser running on the client system 155. The search tool user interface includes a text field 1005 and a button 1010. The user may enter a search query into the search field 1005. As illustrated, the user has entered "eagles" in the text field 1005 as the search query. Selecting the button 1010 after a search query has been entered into the text field 1005 submits the search query to the search interface 160 such that search results for the search query may be identified.

The search tool interface 1000 displays search results 1015a-1015e that have been retrieved for the search query entered in the text field 1005 after the submit button 1010 has been selected. The interface 1000 includes an indicator 1020 of the original search query. The interface 1000 also includes an indicator 1025 of a query category to which the original query was resolved and an indicator 1030 of other categories to which the original query corresponds, but to which the original query was not resolved.

The indicators 1025 and 1030 indicate that the search query corresponds to multiple categories in the ontology 115. For example, one of the queries corresponding to a musicians category in the ontology 170 matches the search query, as indicated by the indicator 1025. In addition, the indicator 1030 indicates that a query corresponding to a football category in the ontology 170 matches the search query, and that a query corresponding to a bird category in the ontology 170 matches the search query.

The indicators 1025 and 1030 also may indicate canonical forms of the query entered in the text field 1005 for the corresponding categories. The canonical form of the entered query for a particular category is a query associated with the particular category that matches the entered query. For example, the entered query matches the query "The Eagles" that is associated with the musicians category, so "The Eagles" is the canonical form of the entered query for the musicians category. Similarly, "Philadelphia Eagles" is the canonical form of the entered query for the football category, and "eagles" is the canonical form of the entered query for the bird category.

The query may be resolved to refer to a single category of query that typically represents queries received at the same time as the query. When the query was resolved to refer to the category indicated by the indicator 1025, the query entered in the text field 1005 was supplemented with information associated with the category. For example, the query may be reformatted into the canonical form of the query for the category. More particularly, the query was resolved to refer only to the musicians category, so the query was reformatted into "The Eagles," which is the canonical form of the query for the musicians category. In addition, the query may be supplemented with one or more keywords associated with the musicians category in the ontology 115. Such reformatting and supplementing may be indicated in the text field 1005.

As a result of the disambiguation of the query by supplementing the query with information associated with the musicians category, the search results 1015a-1015e are all representative of the musicians category. More particularly, the search results 1015a-1015e represent Internet resources that match the supplemented query, which is representative of only the musicians category in the query ontology 115. Therefore, the search results 1015a-1015e all relate to musicians named "The Eagles."

In some implementations, a query may be disambiguated to refer to a category that a user had not intended for the category. In such implementations, one of the indicators 1025 and 1030 may be selected to retrieve search results that are representative of a category corresponding to the selected indicator. For example, two portions of the indicator 1030 may be selectable, with a first portion corresponding to the football category, and a second portion corresponding to the birds category. The user may select the first or second portions of the indicator 1030 to resolve the query to and to retrieve search results that are representative of the category corresponding to the selected portion. After a portion of the indicator 1030 has been selected, the user may select the indicator 1025 to retrieve search results that are representative of the musicians category to which the query was resolved originally.

When one of the indicators 1025 and 1030 is selected, the original query identified by the indicator 1020 may supplement the query with information associated with or identifying the category corresponding to the selected indicator. Search results may be retrieved for the supplemented query, and the search results may be presented on the interface 1000. In addition, the indicators 1025 and 1030 may be modified to indicate the new category to which the original query has been resolved. The modified indicators 1025 and 1030 may be selected to retrieve search results that are representative of a different category, as described above.

In addition, the user may manually indicate that the query is not to be resolved to a particular category such that search results that are not necessarily representative of the particular category are retrieved. For example, the user may select the indicator 1020 to indicate that search results that are not representative of a particular category are to be retrieved.

Figure 11:
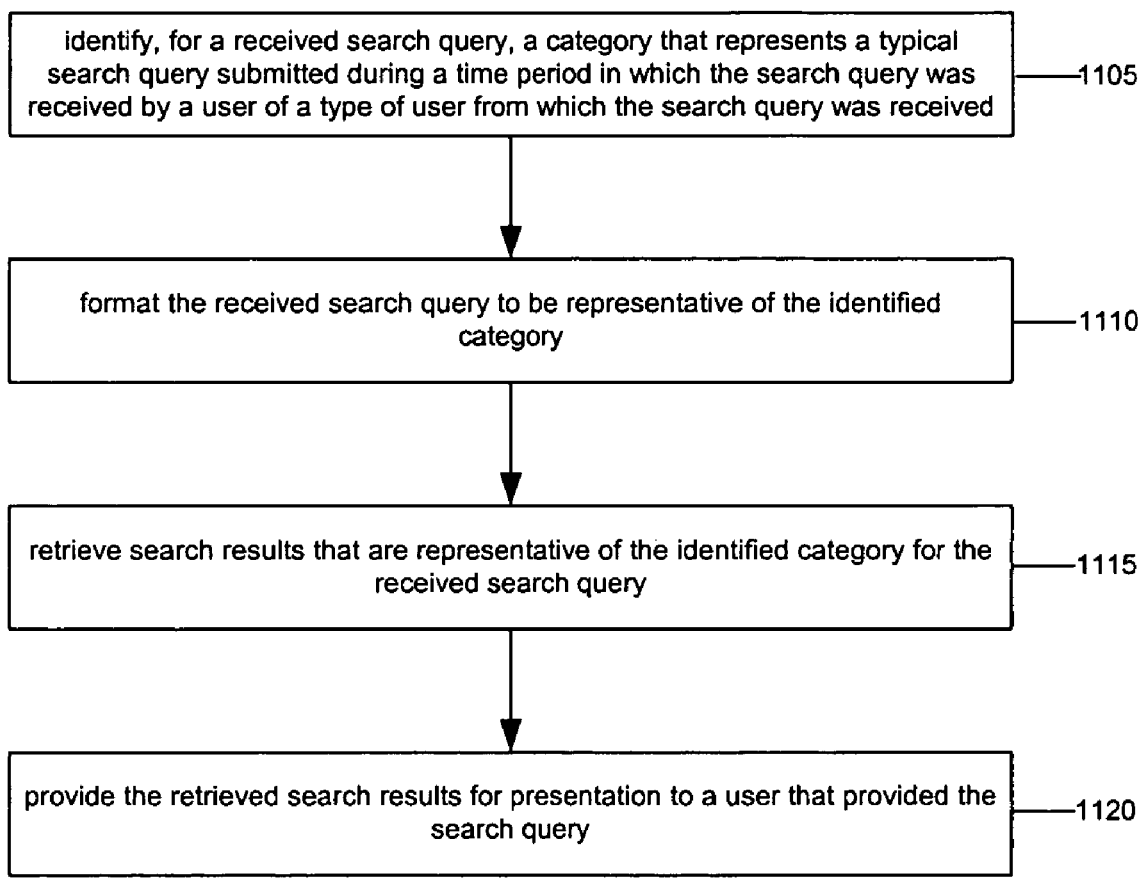
FIG. 11 is a flow chart illustrating an exemplary process for formatting a query to be representative of a query category.

Referring to FIG. 11, a process 1100 is used to format a query received during a time period from a user of a particular type to be representative of a category that typically corresponds to queries submitted during the time period from users of the particular type. The process 1100 represents one implementation of the process 600 of FIG. 6. The process 1100 is executed by a search engine, such as the search engine 110 of FIG. 1A or one of the search engines 165a-165n of FIG. 1B, or by a search interface, such as the search interface 160 of FIG. 1B. For ease of discussion, the process 1100 will be described as being executed by a search engine.

The search engine identifies, for a received search query, a category that represents a typical search query submitted during a time period in which the search query was received by a user of a type of user from which the search query was received (1105). Such an operation may be performed in a similar manner as is done the process 600 of FIG. 6.

The search engine formats the received search query to be representative of the identified category (1110). The query may be formatted into a canonical form of the query for the identified, or may be supplemented with keywords associated with the identified query, as was done in the process 900 of FIG. 9. The search engine retrieves search results for the formatted search query (1115) and provides the retrieved search results for presentation to a user that provided the search query (1120).

Referring to FIG. 12, the search tool user interface 1000 displays search results 1205a-1205e that were retrieved for a query entered in the text field 1005 after the query was supplemented with one or more keywords associated with a particular category of query. The particular category may be a category that typically represents queries received during a time period in which the query was entered in the text field 1005 by a type of user corresponding to the user of the user interface 1000. The search tool user interface 1000 illustrated in FIG. 12 may be presented after the button 1010 of the search tool user interface 1000 illustrated in FIG. 10 has been selected, if the search query entered into the text field 1005 of FIG. 10 corresponds to only one category. Alternatively, the search tool user interface 1000 illustrated in FIG. 12 may be presented after the query has been resolved to refer to only one of the multiple categories. Either approach may be used to display a single category or multiple categories that are used to supplement the search query. Moreover, to the extent that a user edits the text field 1005 to add or omit categories, the auto classifier (e.g., FIG. 9) process may be disengaged automatically or a user interface may be provided to enable manual disengagement of such a process.

The search results 1205a-1205e are representative of the bird category of the ontology 115 because the query entered in the text field 1005 has been supplemented with keywords associated with the bird category. The keywords may be added to the query as a result of being associated with a query category that typically represents queries received during a time period in which the query was specified and with a type of user corresponding to the user of the interface 1000. In addition to including the original query "eagles," the search results 1205a-1205e also may include one or more of the keywords that were used to supplement the original query.

The keywords with which the query has been supplemented may or may not be made perceivable to the user from which the query was received. As a result, the query may or may not be modified within the text field 1005, though the query has been modified within the text field in the illustrated search tool user interface 1000.

The search query illustrated as entered in the text field 1005 may have been specified partially or completely by a user of the interface 1000. For example, the user may specify only the original query (e.g., "eagles") and the remainder of the query may have been added automatically as keywords associated with a particular category of the query. In one implementation, a user may delete one or more of the keywords that have been added to the query. In such an implementation, the deleted keywords may not be added to query again, for example, if search results for the query are retrieved again. In other words, after the query has been supplemented with a keyword once, the keyword will not be added to the query again. Consequently, the user is enabled to control which of the keywords are included in the final query for which search results are retrieved.

Figure 13:
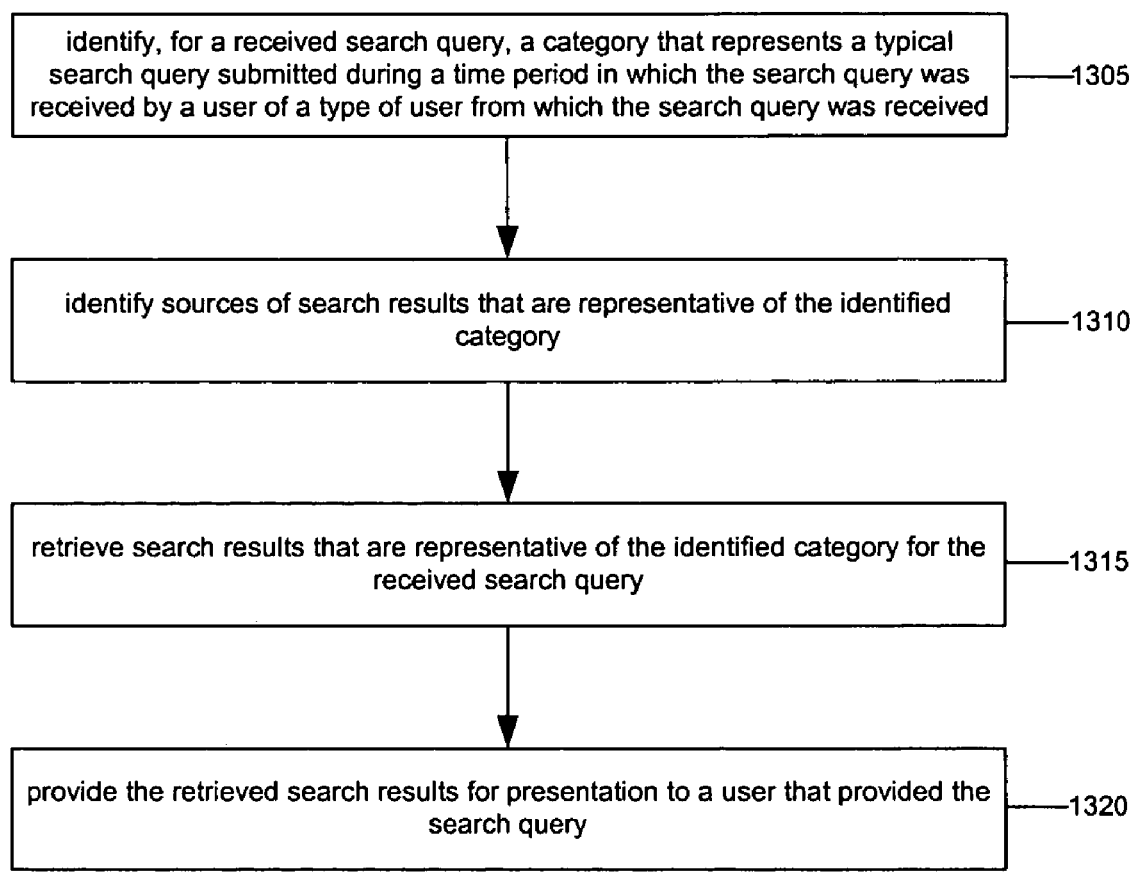
FIG. 13 is a flow chart illustrating an exemplary process for submitting a query to information sources corresponding to a query category.

Referring to FIG. 13, a process 1300 is used to retrieve search results for a query received during a time period from a particular type of user from sources that are representative of a category that typically corresponds to queries submitted during the time period and users of the particular type. The process 1300 represents one implementation of the process 600 of FIG. 6. The process 1300 is executed by a search engine, such as the search engine 110 of FIG. 1A or one of the search engines 165a-165n of FIG. 1B, or by a search interface, such as the search interface 160 of FIG. 1B. For ease of discussion, the process 1300 will be described as being executed by a search engine.

The search engine identifies, for a received search query, a category that represents a typical search query submitted during a time period in which the search query was received by a user of a type of user from which the search query was received (1305). Such an operation may be performed in a similar manner as is done the process 600 of FIG. 6.

The search query identifies sources of search results that are representative of the identified category (1310). The sources may be associated with the identified category in an ontology used to identify the category, such as the ontology 165. The search engine retrieves search results for the received search query from the identified sources (1315). For example, the search engine may submit the search query to each of the identified sources, and may receive search results from each of the identified sources. Alternatively or additionally, the search engine may locally identify and retrieve search results from the identified sources. The search engine may merge the sets of search results received from the identified sources. For example, the search engine may remove duplicative search results and may rank the merged search results. The search engine provides the retrieved search results for presentation to a user that provided the search query (1320).

Figure 14:
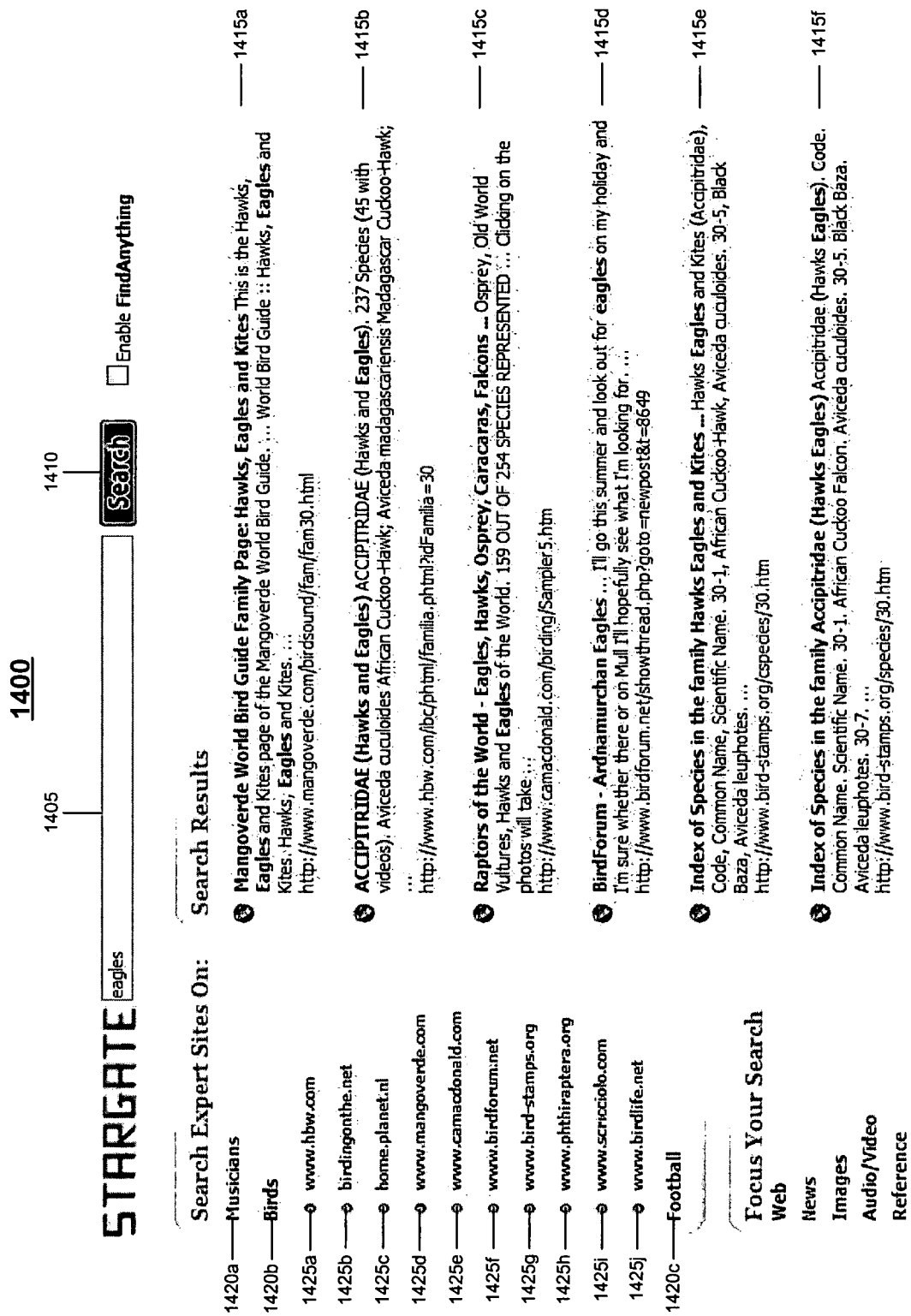
FIG. 14 illustrates another exemplary interface for retrieving search results for a query that is submitted to one or more information sources corresponding to a query category.

Referring to FIG. 14, a search tool user interface 1400 is similar to the search tool user interface 1000 of FIGS. 10 and 12. The search tool user interface 1400 includes a text field 1405 into which a user may enter a search query, and a button 1410 that may be selected to retrieve search results 1415a-1415f for the entered query. As illustrated, the user has entered "eagles" in the text field 1405, and the button 1410 has been selected to retrieve the search results 1415a-1415f. The search tool user interface 1400 also includes category identifiers 1420a-1420c that identify query categories with which the entered query is associated and information source indicators 1425a-1425j that identify information sources corresponding to the categories identified by the category identifiers 1420a-1420c.

The category identifiers 1420a-1420c indicate that the query entered in the text field 1405 is associated with multiple categories in the ontology 170. More particularly, the query is associated with a musicians category, as indicated by the category identifier 1420a, a birds category, as indicated by the category identifier 1420b, and a football category, as indicated by the category identifier 1420c. The query may be resolved to refer to only one of the categories identified by the category identifiers 1420a-1420c. The category to which the query is resolved may be a category that typically represents queries submitted during a time period in which the query was specified in the text field 1405 and in which the button 1410 was selected and to a type of user that specified the query. Alternatively or additionally, the category to which the query is resolved may be one of the multiple categories that has been selected by a user of the interface 1400. For example, an interface enabling selection of one of the multiple categories may be presented to the user prior to presentation of the interface 1400. The query then may be submitted to one or more information sources corresponding to the category to which the query was resolved or to the category that was selected for the query such that the search results 1405a-1405f are retrieved from the information sources.

The information source indicators 1425a-1425j identify the information sources corresponding to the query category to which the query was resolved. More particularly, the information source indicators 1425a-1425j identify information sources corresponding to the birds category to which the query was resolved. Each of the information source indicators 1425a-1425b corresponds to an expert domain listed in the expert domain list 320a of FIG. 3A for the exemplary birds category 205m from the exemplary ontology 115 of FIGS. 2A and 2B.

Each of the search results 1415a-1415f has been retrieved from one of the information sources for which an information source indicator 1425a-1425j is displayed. Because the search results 1415a-1415f are retrieved from one or more of the information sources corresponding to the birds category, the search results 1415a-1415f are all representative of the birds category. Furthermore, selecting one of the information source indicators 1425a-1425j may cause search results only from the corresponding information source to be retrieved and displayed to the exclusion or apparent visual preference or relative order with respect to results from other of the sources, which further ensures that the search results are representative of the birds category in the above example.

In some implementations, a query may be submitted to information sources corresponding to a category that a user had not intended for the category. For example, the query may be submitted to information sources associated with the birds category, even though the user may not have intended the birds category for the query. In such a case, the category identifiers 1420a and 1420c may be selected to indicate that search results that are representative of the musicians category and the football category, respectively, are to be retrieved. Selection of one of the category identifiers 1420a and 1420c may result in submission of the query to one or more information sources corresponding to a category of the selected category identifier. In addition, selecting one of the category identifiers 1420a and 1420c may cause a set of information source indicators identifying the information sources corresponding to the selected category to be displayed on the interface 1400. The newly revealed information source indicators may be selected in manner similar to the information source indicators 1425a-1425j. In addition, the information source indicators 1425a-1425j may be removed from the interface 1400 when one of the category identifiers 1420 and 1420c is selected.

Figure 15:
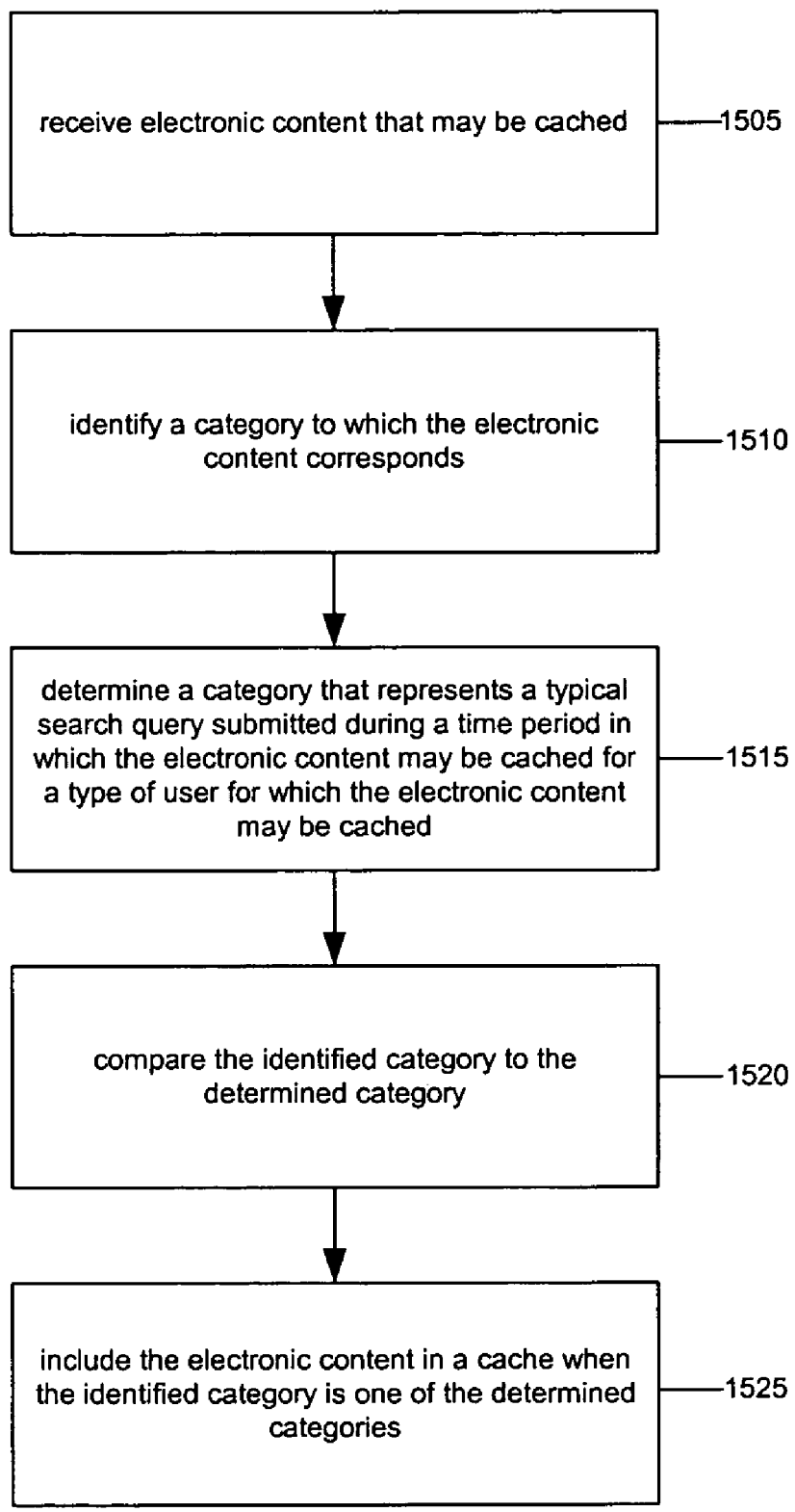
FIG. 15 is a flow chart illustrating an exemplary process for managing a cache of category-specific electronic content Like reference symbols in the various drawings indicate like elements.

Referring to FIG. 15, a process 1500 is used to manage a cache based on a category of electronic content that is to be stored in the cache. More particularly, inclusion of the electronic content in the cache may be conditioned upon the electronic content being representative of a category that typically represents search queries submitted during a time period in which the content may be cached by a type of user for which the content may be cached.

For example, the process 1500 may be executed when determining whether to cache a web page relating to video games for a teenage male between 2 and 3 P.M. A log of search queries may indicate that queries submitted by teenage males between 2 and 3 P.M. typically relate to video games. Because teenage males typically search for electronic content related to video games between 2 and 3 P.M., the web page may be included in a cache for the teenage male between 2 and 3 P.M. Alternatively the log may indicate that queries submitted by teenage males between 2 and 3 P.M. typically relate to math, in which case the web page may not be cached for the teenage male between 2 and 3 P.M.

The process 1500 may be executed by a system on which the cache is maintained. For example, the electronic content may be search results retrieved for a search query, and the search results may be cached by a search engine that retrieves the search results, such as the search engine 110 of FIG. 1A, or a search interface that provides the search results, such as the search interface 160 of FIG. 1B. Alternatively, the electronic content may be cached by a client system to which the electronic content is provided, such as the client system 105 of FIG. 1A or the client system 155 of FIG. 1B. For ease of description, the process 1500 will be described as being performed by a caching system.

The caching system receives electronic content that may be cached at a time corresponding to one of the multiple time periods for a user corresponding to a particular one of the multiple types (1505). Indications of the time period during which the electronic content may be cached and of the type of user for whom the electronic content may be cached may be associated with the request as attributes of the request. The electronic content may include a web page, an e-mail message, an instant message, a file, or another piece of electronic content. Alternatively or additionally, the electronic content may include search results that were retrieved in response to a search query received by the caching system. Receiving the electronic content may include receiving the content from a provider of the electronic content, or accessing the electronic content from the provider.

The caching system identifies one of the multiple categories to which the electronic content corresponds (1510). For example, if the electronic content is search results, the caching system may use an ontology, such as the ontology 115 of FIG. 1A or the ontology 170 of FIG. 1B, to identify a category corresponding to a search query for which the search results were identified. Alternatively or additionally, the caching system may match the electronic content against the queries and keywords associated with the categories included in the ontology. If a particular category corresponds to a query or keyword that is included in the electronic content, then the particular category corresponds to the received query.

The caching system determines a category that represents a typical search query submitted during a time period in which the electronic content may be cached for a type of user for which the electronic content may be cached (1515). Such an operation may be performed in a similar manner as is done the process 600 of FIG. 6. The caching system may compare the identified category to the determined category (1520). The caching system includes the electronic content in the cache when the identified category of the electronic content is one of the determined categories (1525). Otherwise, the electronic content is not included in the cache.

A query log is described throughout as including queries along with information describing the queries, such as the times at which the queries were submitted and attributes of users that submitted the queries. In other implementations, the query log also may include one or more search results retrieved for the queries. Each of the search results may be associated in the query log with a time at which a corresponding search query was submitted and demographic information describing a user that submitted the query. Each of the search results may be processed and used to manage electronic content in a similar manner as the queries from the query log, as described above.

The described techniques for managing electronic content use a log of queries that includes indications of times at which the queries were submitted and types of users that submitted the queries. In other implementations, only a subset of such information or other information describing the queries may be included in the query log. For example, information describing computer systems or applications used to submit the queries may be included in the log. Such additional information may be considered when managing electronic content, as described above. Furthermore, the described techniques for managing electronic content consider both times at which the queries and the content requests were submitted and types of users that submitted the queries and the content requests when identifying an appropriate manner in which electronic content should be managed. Other implementations of the described techniques may consider only one of the submission times and the user types when identifying the appropriate manner in which electronic content should be managed.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for providing category-specific electronic content, the method comprising:
    accessing information, which includes at least two logged query submission time attributes and at least two logged category attributes, and which is related to queries submitted to a search engine and stored in a query log;
    based on the accessed information, identifying relationships between individual of the logged query submission time attributes and respective logged category attributes corresponding thereto;
    receiving a search query;
    determining received query submission time attributes corresponding to the received search query;
    comparing the received query submission time attributes to the logged query submission time attributes in the accessed information;
    conditioned on determining that a first of the logged query submission time attributes corresponds to the received search query:
        determining that a first of the logged category attributes corresponds to the received search query based on the first logged time attribute that is determined to correspond to the received search query and based on the relationships identified between individual of the logged query submission time attributes and respective logged category attributes corresponding thereto; and
        identifying search results based on the determined first logged category attribute; and
    conditioned on determining that a second of the logged query submission time attributes, which differs from the first logged query submission time attribute, corresponds to the received search query:
        determining that a second of the logged category attributes corresponds to the received search query based on the second logged time attribute that is determined to correspond to the received search query and based on the relationships identified between individual of the logged query submission time attributes and respective logged category attributes corresponding thereto; and
        identifying search results based on the determined second logged category attribute.

2. The method of claim 1 wherein:
accessing information, which includes at least two logged query submission time attributes and at least two logged category attributes, and which is related to queries submitted to a search engine and stored in a query log includes accessing information included in the query log; and
identifying relationships between individual of the logged query submission time attributes and respective logged category attributes corresponding thereto includes:
    analyzing the accessed information included in the query log;
    based on the analysis, identifying relationships between individual of the logged query submission time attributes and respective logged category attributes corresponding thereto; and
    storing, in electronic storage, information indicating the identified relationships between individual of the logged query submission time attributes and respective logged category attributes corresponding thereto.

3. The method of claim 2 wherein identifying relationships between individual of the logged query submission time attributes and respective logged category attributes corresponding thereto includes identifying categories associated with queries that have a probability of being received during a time period corresponding to the query submission time attributes that exceeds a threshold.

4. The method of claim 3 wherein accessing information, which includes at least two logged query submission time attributes and at least two logged category attributes, and which is related to queries submitted to a search engine and stored in a query log includes accessing category information for queries stored in the query log, the category information being determined upon addition of queries to the query log.

5. The method of claim 1 wherein the search query is a first search query and the received query submission time attributes are first received query submission time attributes, further comprising:
receiving a second search query, the second search query including the same query terms as the first search query;
determining second received query submission time attributes corresponding to the second received search query, the second received query submission time attributes being different than the first received query submission time attributes;
comparing the second received query submission time attributes to the logged query submission time attributes in the accessed information;
conditioned on determining that a third of the logged query submission time attributes corresponds to the second received search query, the third logged time attribute being different than the first logged time attribute and the second logged time attribute:
determining that a third of the logged category attributes corresponds to the second received search query based on the third logged time attribute that is determined to correspond to the second received search query and based on the relationships identified between individual of the logged query submission time attributes and respective logged category attributes corresponding thereto.

6. The method of claim 1 further comprising:
identifying multiple categories associated with the received search query based on the query terms included in the search query, wherein
determining that a first of the logged category attributes corresponds to the received search query includes selecting a category from among the identified multiple categories based on the first logged time attribute that is determined to correspond to the received search query and based on the relationships identified between individual of the logged query submission time attributes and respective logged category attributes corresponding thereto.

7. The method of claim 1 further comprising:
presenting the identified search results.

8. The method of claim 1 wherein:
determining received query submission time attributes corresponding to the received search query includes determining an hour within a day, a day within a week, a day within a month, a day within a year, a week within a month, a week within a year, or a month within a year.

9. The method of claim 1 wherein:
accessing information, which includes at least two logged query submission time attributes and at least two logged category attributes, and which is related to queries submitted to a search engine and stored in a query log includes accessing information, which includes at least two logged query submission time attributes, at least two user characteristic attributes, and at least two logged category attributes, and which is related to queries submitted to a search engine and stored in a query log;
identifying relationships between individual of the logged query submission time attributes and respective logged category attributes corresponding thereto includes, based on the accessed information, identifying relationships between the logged query submission time attributes, the logged user characteristic attributes, and respective logged category attributes corresponding to related logged query submission time attributes and logged user characteristic attributes;
determining received query submission time attributes corresponding to the received search query includes determining received query submission time attributes and received query user characteristic attributes corresponding to the received search query;
comparing the received query submission time attributes to the logged query submission time attributes in the accessed information includes comparing the received query submission time attributes to the logged query submission time attributes in the accessed information and comparing the received query user characteristic attributes to the logged user characteristic attributes in the accessed information;
conditioned on determining that a first of the logged query submission time attributes corresponds to the received search query, determining that a first of the logged category attributes corresponds to the received search query includes, conditioned on determining that a first of the logged query submission time attributes and a first of the logged user characteristic attributes corresponds to the received search query, determining that a first of the logged category attributes corresponds to the received search query based on the first logged time attribute and the first logged user characteristic attribute that are determined to correspond to the received search query and based on the relationships identified between the logged query submission time attributes, the logged user characteristic attributes, and respective logged category attributes corresponding to related logged query submission time attributes and logged user characteristic attributes; and
conditioned on determining that a second of the logged query submission time attributes, which differs from the first logged query submission time attribute, corresponds to the received search query, determining that a second of the logged category attributes corresponds to the received search query includes, conditioned on determining that a second of the logged query submission time attributes and a second of the logged user characteristic attributes corresponds to the received search query, determining that a second of the logged category attributes corresponds to the received search query based on the second logged time attribute and the second logged user characteristic attribute that are determined to correspond to the received search query and based on the relationships identified between the logged query submission time attributes, the logged user characteristic attributes, and respective logged category attributes corresponding to related logged query submission time attributes and logged user characteristic attributes.

10. The method of claim 9 wherein the search query is a first search query, the received query submission time attributes are first received query submission time attributes, and the received query user characteristic attributes are first received query user characteristic attributes, further comprising:
receiving a second search query, the second search query including the same query terms as the first search query;

determining second received query submission time attributes and second received query user characteristic attributes corresponding to the second received search query, the second received query submission time attributes corresponding to the first received query submission time attributes and the second received query user characteristic attributes being different than the first received query user characteristic attributes;

comparing the second received query submission time attributes to the logged query submission time attributes in the accessed information and comparing the second received query user characteristic attributes to the logged user characteristic attributes in the accessed information;

conditioned on determining that the first of the logged query submission time attributes and a third of the logged user characteristic attributes corresponds to the second received search query, the third logged user characteristic attribute being different than the first logged user characteristic attribute:

determining that a third of the logged category attributes corresponds to the second received search query based on the first logged time attribute and the third logged user characteristic attribute that are determined to correspond to the second received search query, the determined third logged category attribute being different than the determined first logged category attribute; and identifying search results based on the determined third logged category attribute.

11. The method of claim 9 wherein:

determining received query user characteristic attributes corresponding to the received search query includes identifying a gender of a user that submitted the query, an age of the user that submitted the query, or a location of the user that submitted the query.

12. The method of claim 9 wherein:

identifying relationships between the logged query submission time attributes, the logged user characteristic attributes, and respective logged category attributes corresponding to related logged query submission time attributes and logged user characteristic attributes includes identifying multiple logged category attributes associated with queries having first query submission time attributes, each of the multiple logged category attributes being associated with a different user characteristic attribute; and determining that a first of the logged category attributes corresponds to the received search query based on the first logged time attribute and the first logged user characteristic attribute that are determined to correspond to the received search query includes selecting, from among the multiple logged category attributes associated with queries having first query submission time attributes, a first logged category based on the received query user characteristic attributes.

13. The method of claim 1 wherein identifying search results based on the determined first logged category attribute includes:

formatting the search query to be representative of a category associated with the determined first logged category attribute; and retrieving search results for the formatted search query.

14. The method of claim 13 wherein formatting the search query includes supplementing the search query with additional information that is representative of the category associated with the determined first logged category attribute.

15. The method of claim 14 wherein supplementing the search query includes formatting the search query into a canonical form of the search query for the category associated with the determined first logged category attribute.

16. The method of claim 14 wherein supplementing the search query includes supplementing the search query with one or more keywords that are representative of the category associated with the determined first logged category attribute.

17. The method of claim 1 wherein identifying search results based on the determined first logged category attribute includes:

routing the search query to at least one source of search results that are representative of a category associated with the determined first logged category attribute; and receiving search results for the search query from the at least one source.

18. The method of claim 1 wherein:

accessing information, which includes at least two logged query submission time attributes and at least two logged category attributes, and which is related to queries submitted to a search engine and stored in a query log includes accessing a table having at least two entries, each of the at least two entries being associated with at least one query submission time attribute and at least one corresponding category attribute; and identifying relationships between individual of the logged query submission time attributes and respective logged category attributes corresponding thereto includes:

identifying an entry of the table that is associated with at least a first time attribute; and identifying at least one category attribute that is associated with the identified entry in the table.

19. A method for caching electronic content, the method comprising:

accessing information, which includes at least two logged query submission time attributes and at least two logged category attributes, and which is related to queries submitted to a search engine and stored in a query log;

based on the accessed information, identifying relationships between individual of the logged query submission time attributes and respective logged category attributes corresponding thereto;

accessing electronic content;

determining a first category attribute corresponding to the electronic content;

determining a first time attribute related to a current time;

determining a second of the logged category attributes that corresponds to the first time attribute based on the relationships identified between individual of the logged query submission time attributes and respective logged category attributes corresponding thereto;

comparing the first category attribute to the determined second logged category attribute;

conditioned on determining that the first category attribute corresponds to the determined second logged category attribute:

storing the electronic content in a cache during a time period corresponding to the first time attribute; and accessing the electronic content from the cache based on a request for the electronic content received during the time period corresponding to the first time attribute.

20. The method of claim 19 wherein:
accessing information, which includes at least two logged query submission time attributes and at least two logged category attributes, and which is related to queries submitted to a search engine and stored in a query log includes accessing information included in the query log; and
identifying relationships between individual of the logged query submission time attributes and respective logged category attributes corresponding thereto includes:
analyzing the accessed information included in the query log;
based on the analysis, identifying relationships between individual of the logged query submission time attributes and respective logged category attributes corresponding thereto; and
storing, in electronic storage, information indicating the identified relationships between individual of the logged query submission time attributes and respective logged category attributes corresponding thereto.

21. The method of claim 20 wherein identifying relationships between individual of the logged query submission time attributes and respective logged category attributes corresponding thereto includes identifying categories associated with queries that have a probability of being received during a time period corresponding to the query submission time attributes that exceeds a threshold.

22. The method of claim 21 wherein accessing information, which includes at least two logged query submission time attributes and at least two logged category attributes, and which is related to queries submitted to a search engine and stored in a query log includes accessing category information for queries stored in the query log, the category information being determined upon addition of queries to the query log.

23. The method of claim 19 wherein:
determining a first time attribute related to a current time includes determining an hour within a day, a day within a week, a day within a month, a day within a year, a week within a month, a week within a year, or a month within a year.

24. A method for providing advertisements, the method comprising:
accessing information, which includes at least two logged time attributes and at least two logged category attributes, and which is related to queries submitted to a search engine and stored in a query log;
based on the accessed information, identifying relationships between individual of the logged time attributes and respective logged category attributes corresponding thereto;
receiving a request associated with an advertisement;
determining received request time attributes corresponding to the received request associated with the advertisement;
comparing the received request time attributes to the logged time attributes in the accessed information;
conditioned on determining that a first of the logged time attributes corresponds to the received request associated with the advertisement:
determining that a first of the logged category attributes corresponds to the received request associated with the advertisement based on the first logged time attribute that is determined to correspond to the received request associated with the advertisement and based on the relationships identified between individual of the logged time attributes and respective logged category attributes corresponding thereto; and
providing a first advertisement based on the determined first logged category attribute; and
conditioned on determining that a second of the logged time attributes, which differs from the first logged time attribute, corresponds to the received request associated with the advertisement:
determining that a second of the logged category attributes corresponds to the received request associated with the advertisement based on the second logged time attribute that is determined to correspond to the received request associated with the advertisement and based on the relationships identified between individual of the logged time attributes and respective logged category attributes corresponding thereto; and
providing a second advertisement, which differs from the first advertisement, based on the determined second logged category attribute.

25. The method of claim 24 wherein:
accessing information, which includes at least two logged time attributes and at least two logged category attributes, and which is related to queries submitted to a search engine and stored in a query log includes accessing information included in the query log; and
identifying relationships between individual of the logged time attributes and respective logged category attributes corresponding thereto includes:
analyzing the accessed information included in the query log;
based on the analysis, identifying relationships between individual of the logged time attributes and respective logged category attributes corresponding thereto; and
storing, in electronic storage, information indicating the identified relationships between individual of the logged time attributes and respective logged category attributes corresponding thereto.

26. The method of claim 25 wherein identifying relationships between individual of the logged time attributes and respective logged category attributes corresponding thereto includes identifying categories associated with requests that have a probability of being received during a time period corresponding to the time attributes that exceeds a threshold.

27. The method of claim 26 wherein accessing information, which includes at least two logged time attributes and at least two logged category attributes, and which is related to queries submitted to a search engine and stored in a query log includes accessing category information for queries stored in the query log, the category information being determined upon addition of queries to the query log.

28. The method of claim 24 wherein:
determining received request time attributes corresponding to the received request associated with the advertisement includes determining an hour within a day, a day within a week, a day within a month, a day within a year, a week within a month, a week within a year, or a month within a year.

* * * * *